(12) United States Patent
Ooishi et al.

(10) Patent No.: US 8,317,312 B2
(45) Date of Patent: Nov. 27, 2012

(54) INK COMPOSITION, INK SET AND IMAGE FORMING PROCESS

(75) Inventors: Yasufumi Ooishi, Kanagawa (JP); Yuji Kume, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 114 days.

(21) Appl. No.: 13/053,227

(22) Filed: Mar. 22, 2011

(65) Prior Publication Data
US 2011/0234690 A1 Sep. 29, 2011

(30) Foreign Application Priority Data
Mar. 24, 2010 (JP) .................. 2010-068163

(51) Int. Cl.
*G01D 11/00* (2006.01)
(52) U.S. Cl. ...................................... 347/100
(58) Field of Classification Search ............ 347/43, 347/95, 100; 106/31.43, 31.46, 31.47
See application file for complete search history.

(56) References Cited

U.S. PATENT DOCUMENTS

| 5,879,438 | A  | * | 3/1999  | Fujita et al. ............... 106/31.18 |
| 7,118,207 | B2 | * | 10/2006 | Takahashi et al. ............. 347/100 |
| 7,399,349 | B2 | * | 7/2008  | Taguchi et al. ............ 106/31.43 |

FOREIGN PATENT DOCUMENTS

| JP | 2001-348519 A | 12/2001 |
| JP | 2004-114692 A | 4/2004 |

* cited by examiner

*Primary Examiner* — Lamson Nguyen
(74) *Attorney, Agent, or Firm* — SOLARIS Intellectual Property Group, PLLC

(57) ABSTRACT

The invention provides an ink composition including a pigment, water, a polymerizable compound having an acrylamide structure, a polymerization initiator and a wetting agent that is in the form of a solid at a temperature of 25° C. and an atmospheric pressure of 1 bar, the wetting agent being included in the ink composition in an amount of from 0.01% by mass to 400% by mass with respect to the polymerizable compound having an acrylamide structure.

14 Claims, 1 Drawing Sheet

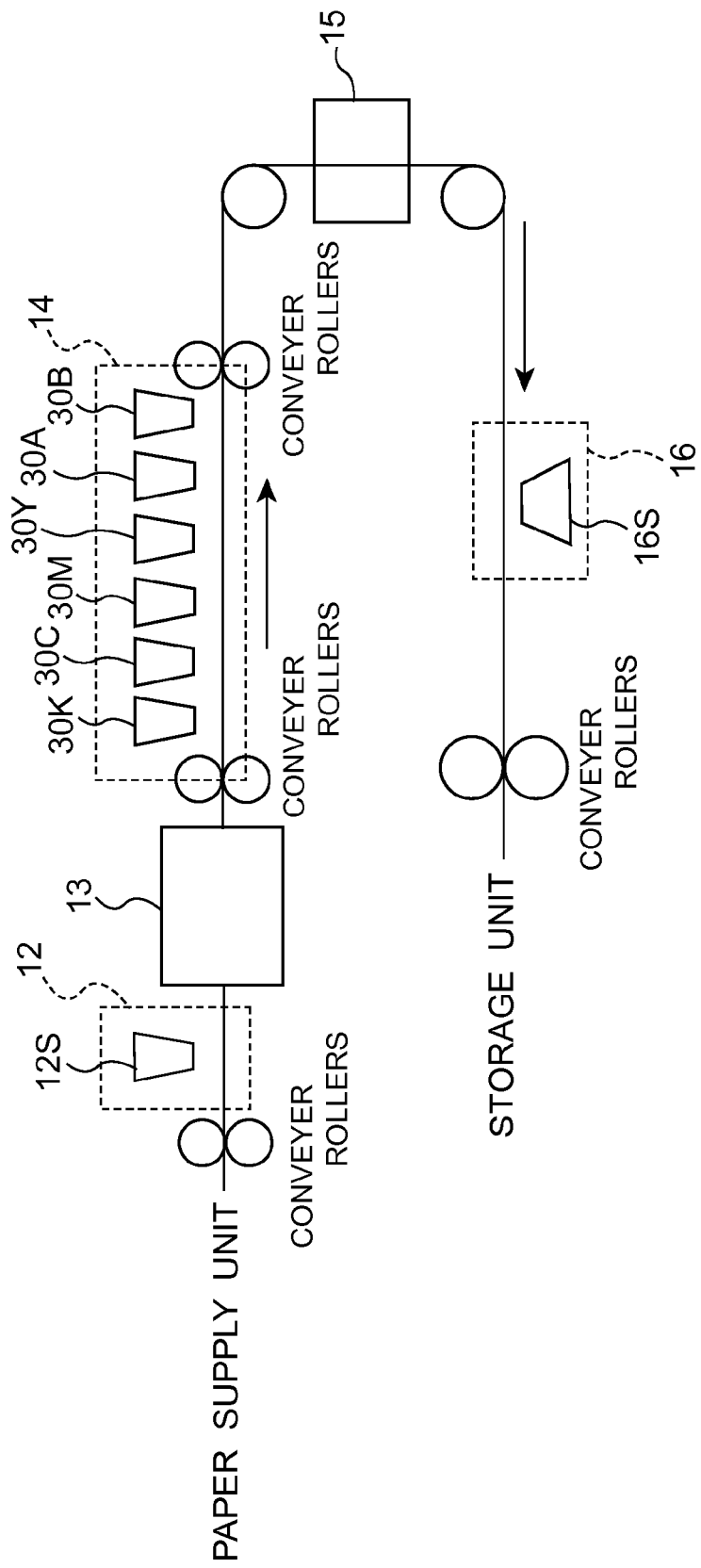

INK COMPOSITION, INK SET AND IMAGE FORMING PROCESS

CROSS-REFERENCE TO RELATED APPLICATION

This application claims priority under 35 USC 119 from Japanese Patent Application No. 2010-068163 filed Mar. 24, 2010, the disclosure of which is incorporated by reference herein.

BACKGROUND OF THE INVENTION

1. Technical Field

The present invention relates to an ink composition, an ink set and an image forming process.

2. Related Art

As a method of recording a color image, inkjet technology is known. Inkjet technology has been applied to the field of office printers, home printers and the like, but it has started to be used in the field of commercial printing in recent years.

As a component included in the ink materials used for inkjet printing, a pigment is widely used. When a pigment is used, water fastness or light fastness of the obtained image and dischargeability of ink from an ejection head are important, and various studies have been made in order to improve these aspects.

For example, as an invention in which dischargeability of ink from an ejection head is improved, Japanese Patent Application Laid-Open (JP-A) No. 2001-348519 discloses an inkjet recording method in which a two-liquid ink is used, the two-liquid ink consisting of an aggregating liquid that includes an aggregating agent, and an ink composition that includes a reactive oligomer as a high-boiling point wetting agent.

Further, as an invention in which water fastness and light fastness of the obtained image are improved, for example, JP-A No. 2004-114692 discloses an actinic energy ray-curable aqueous ink that includes a polymerizable monomer having a specific structure.

However, in the above techniques, positional accuracy of ink dotting with respect to a recording medium has not been taken into consideration and there is room for further improvement in this aspect. In addition, there is a need for further improvement in blocking resistance.

In view of the aforementioned, the present inventors have made intensive studies and, as a result, arrived at the present invention by discovering that when an ink includes a wetting agent at a certain proportion with respect to a polymerizable compound having an acrylamide structure, positional accuracy of ink dotting and blocking resistance of the ink can be improved.

SUMMARY OF THE INVENTION

An aspect of the invention provides an ink composition including a pigment, water, a polymerizable compound having an acrylamide structure, a polymerization initiator and a wetting agent that is in the form of a solid at a temperature of 25° C. and an atmospheric pressure of 1 bar, the wetting agent being included in the ink composition in an amount of from 0.01% by mass to 400% by mass with respect to the polymerizable compound having an acrylamide structure.

DETAILED DESCRIPTION OF THE INVENTION

Ink Composition

The ink composition of the present invention includes a pigment, water, a (A) polymerizable compound having an acrylamide structure, a polymerization initiator and a (B) wetting agent (B) that is in the form of a solid under normal conditions (i.e., at a temperature of 25° C. and an atmospheric pressure of 1 bar) (hereinafter, also referred to as a "solid wetting agent"). In the ink composition, the amount of the (B) wetting agent with respect to the amount of the (A) polymerizable compound having an acrylamide structure is from 0.01% by mass to 400% by mass.

Solid Wetting Agent

The ink composition of the present invention includes at least one kind of wetting agent that is in a solid state under normal conditions. When needed, the ink composition may include a dispersant, a surfactant or other components. The solid wetting agent according to the present invention is not particularly limited as long as the solid wetting agent is in a solid state under normal conditions. In the present specification, a compound that is used to keep an adequate water retentivity is referred to as a wetting agent.

It is thought that since the solid wetting agent used in the present invention exists in a state in which much of the solid wetting agent forms a hydrogen bond with molecules of water, the ink composition maintains an adequate water retentivity. In addition to that, since the solid wetting agent is included in an amount in a specific range with respect to the polymerizable compound having an acrylamide structure, it is thought that ink is effectively discharged in a region in the vicinity of nozzles, thereby improving the deposition accuracy of ink droplets.

The solid wetting agent of the present invention may be used alone or two or more kinds in combination.

The ratio ((B)/(A)×100, hereinafter, also referred to as "B/A ratio"), which represents the amount of the (B) solid wetting agent with respect to the amount of the (A) polymerizable compound having an acrylamide structure (described later) is from 0.01% by mass to 400% by mass, preferably from 0.1% by mass to 200% by mass, and most preferably from 0.2% by mass to 50% by mass.

The solid wetting agent used in the present invention preferably contains, for instance, at least one kind of compound selected from a group consisting of a sugar not having an unsaturated bond in a side chain thereof and a compound represented by the following formulas (I) to (III).

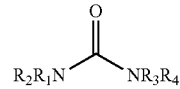

Formula (I)

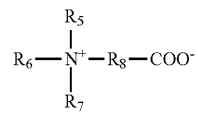

Formula (II)

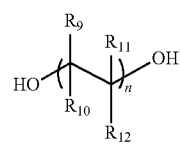

Formula (III)

wherein, in Formula (I) to (III), $R_1$ to $R_7$ each independently represent a hydrogen atom, a saturated or unsaturated hydrocarbon group having 10 or less carbon atoms, a heterocyclic group or an aromatic group; $R_8$ represents a divalent saturated hydrocarbon group having 1 to 3 carbon atoms; $R_9$ to $R_{12}$ each independently represents a hydrogen atom, a saturated or unsaturated hydrocarbon group having 5 or less carbon atoms or a hydroxyl group; n represents an integer of 1 to 30, and when n is 2 or greater, two or more of $R_9$ to $R_{12}$ may be the same or different from each other.

Solid Wetting Agent Represented by Formula (I)

In the solid wetting agent represented by formula (I), each of $R_1$ to $R_4$ independently represents a hydrogen atom, a saturated or unsaturated hydrocarbon group having 10 or less carbon atoms, a heterocyclic group, or an aromatic group. These groups may have a straight-chain, branched, or cyclic structure.

The saturated or unsaturated hydrocarbon group having 10 or less carbon atoms represented by $R_1$ to $R_4$ is not particularly limited, but examples thereof include a methyl group, an ethyl group, and a propyl group.

The heterocyclic group represented by $R_1$ to $R_4$ may be, more specifically, at least one kind selected from a group consisting of formula (I') and formula (I").

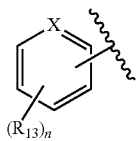

formula (I')

In formula (I'), X represents CH or N; $R_{13}$ represents a saturated or unsaturated hydrocarbon group having 10 or less carbon atoms (more preferably a saturated hydrocarbon group having from 1 to 5 carbon atoms and still more preferably a saturated hydrocarbon group having from 1 to 3 carbon atoms); and n represents an integer of from 1 to 4.

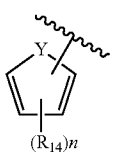

formula (I")

In formula (I"), Y represents $CH_2$, NH, O, or S; $R_{14}$ represents a saturated or unsaturated hydrocarbon group having 10 or less carbon atoms (more preferably a saturated hydrocarbon group having from 1 to 5 carbon atoms and still more preferably a saturated hydrocarbon group having from 1 to 3 carbon atoms); and n represents an integer of from 1 to 3.

The heterocyclic group represented by $R_1$ to $R_4$ is not particularly limited, as long as it is a heterocyclic ring. Examples of the heterocyclic ring include a pyridine ring, a pyrrole ring, and a thiophene ring.

The aromatic group represented by $R_1$ to $R_4$ is not particularly limited as long as it is an aromatic group. Examples of the aromatic group include a benzene ring.

Each of $R_1$ to $R_4$ in formula (I) of the present invention is preferably a hydrogen atom or a saturated hydrocarbon group having from 1 to 5 carbon atoms, more preferably a hydrogen atom or a saturated hydrocarbon group having from 1 to 3 carbon atoms, and most preferably a hydrogen atom.

The solid wetting agent represented by formula (I) is not particularly limited, but exemplary compounds thereof include 1,3-dimethyl urea, ethylenic urea, N-propyl urea, and urea.

Among the solid wetting agents represented by formula (I), urea is most preferable.

Solid Wetting Agent Represented by Formula (II)

Each of $R_5$ to $R_7$ of the wetting agent represented by formula (II) independently represents a hydrogen atom, a saturated or unsaturated hydrocarbon group having 10 or less carbon atoms, a heterocyclic group, or an aromatic group. $R_8$ represents a divalent saturated hydrocarbon group having from 1 to 3 carbon atoms. These groups may have a straight-chain, branched, or cyclic structure.

Details of the groups represented by $R_5$ to $R_7$ in formula (II) are the same as those represented by $R_1$ to $R_4$ in formula (I).

Each of $R_5$ to $R_7$ in formula (II) is preferably a hydrogen atom or a saturated hydrocarbon group having from 1 to 5 carbon atoms, more preferably a hydrogen atom or a saturated hydrocarbon group having from 1 to 3 carbon atoms, and most preferably a hydrogen atom.

$R_8$ in formula (II) represents a divalent saturated hydrocarbon group having from 1 to 3 carbon atoms.

The divalent saturated hydrocarbon group having from 1 to 3 carbon atoms represented by $R_8$ in formula (II) is not particularly limited, but examples thereof include a methylene group, an ethylene group, and a propylene group.

$R_8$ in formula (II) is preferably a divalent saturated hydrocarbon group having one carbon atom (i.e., a methylene group).

Examples of the solid wetting agent represented by formula (II) include betaine anhydrous, N,N,N-triethyl glycine, and N,N,N-tripropyl glycine.

Among the compounds represented by formula (II), betaine anhydrous is particularly preferable.

Solid Wetting Agent Represented by Formula (III)

Each of $R_9$ to $R_{12}$ of the wetting agent represented by formula (III) independently represents a hydrogen atom, a saturated or unsaturated hydrocarbon group having 5 or less carbon atoms, or a hydroxyl group. These groups may have a straight-chain, branched, or cyclic structure. n represents an integer of from 1 to 30. When n is 2 or greater, the two or more of $R_9$ to $R_{12}$ may be different from one another.

The saturated or unsaturated hydrocarbon group having 5 or less carbon atoms represented by $R_9$ to $R_{12}$ is not particularly limited, but examples thereof include a methyl group, an ethyl group, a propyl group, and a butyl group.

Each of $R_9$ to $R_{12}$ is independently preferably a hydrogen atom, a saturated hydrocarbon group having from 1 to 4 carbon atoms, or a hydroxyl group; more preferably a hydrogen atom or a saturated hydrocarbon group having one carbon atom (i.e., a methyl group) or a hydroxyl group; and most preferably a hydrogen atom or a hydroxyl group.

Examples of the solid wetting agent represented by formula (III) include xylitol, 2,2-dimethyl-1,3-propanediol, trimethylolpropane, 1,6-hexanediol, 1,2,6-hexanetriol, and sorbitol.

Among the solid wetting agents represented by formula (III), 2,2-dimethyl-1,3-propanediol, trimethylolpropane, 1,6-hexanediol and 1,2,6-hexanetriol are particularly preferable.

Sugar not Having Unsaturated Bond in Side Chain

Examples of the sugar not having an unsaturated bond in a side chain as the solid wetting agent include a nonreactive sugar such as maltitose, fructose, tagatose, sorbose, ribose, xylose, arabinose, lyxose, glucose, mannose, allose, altrose, gulose, idose, galactose, talose, maltose, cellobiose, trehalose, gentiobiose, isomaltose, lactose, sucrose, saccharose, raffinose, gentianose, stachyose, or xylan. Among these sugars, glucose or maltitose is particularly preferable.

The solid wetting agent of the present invention is preferably a sugar not having an unsaturated bond in a side chain thereof or a compound represented by any one of formula (I) to formula (III). More preferably, the solid wetting agent of the present invention is a compound represented by formula (I) or (III), particularly preferably a compound represented by formula (I).

Polymerizable Compound Having Acrylamide Structure

The ink composition according to the present invention includes at least one kind of polymerizable compound having an acrylamide structure in the molecule thereof. The ink composition is polymerized when exposed to actinic energy radiation (such as radiation rays, light or electron beams).

The polymerizable compound of the present invention having an acrylamide structure is not particularly limited, but is preferably a water-soluble compound. The term "Water-soluble" means that the compound is dissolves in water in an amount that gives a certain concentration. Any compound that dissolves in a water-based ink (preferably, uniformly) may be usable. It is also possible to use a compound that dissolves in ink (preferably, uniformly) when its solubility is increased by adding a water-soluble organic solvent (described layer). Specifically, the compound preferably has a solubility in water at 25° C. of 5% by mass or more, more preferably 10% by mass or more.

The polymerizable compound having an acrylamide structure in the molecule thereof is preferably a compound represented by following formula (1).

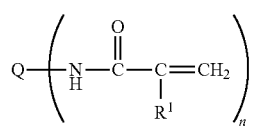

formula (1)

In formula (1), Q represents an n-valent linking group; $R^1$ represents a hydrogen atom or a methyl group; and n represents an integer of 1 or greater.

The compound represented by formula (1) is a compound in which an unsaturated monomer is linked to a linking group Q via amide bonding. $R^1$ represents a hydrogen atom or a methyl group, and preferably a hydrogen atom. The valency n of the linking group Q is not particularly limited, but is preferably 2 or more from the viewpoint of enhancing polymerization efficiency and ejection stability. The valency n is preferably from 2 to 6, and more preferably from 2 to 4.

The linking group Q is not particularly limited as long as it can be linked to an acrylamide structure, but Q is preferably selected from linking groups that make the compound represented by formula (1) satisfy the water-solubility as discussed above. Specifically, Q is preferably a residue obtained by eliminating one or more hydrogen atoms or hydroxyl groups from a compound selected from the following compound group X.

Compound Group X

The compound group X includes: polyols such as ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butanetriol, 1,2,6-hexanetriol, 1,2,5-pentanetriol, thioglycol, trimethylolpropane, ditrimethylolpropane, trimethylolethane, ditrimethylolethane, neopentylglycol, pentaerythritol, dipentaerythrytol, condensates thereof, low molecular poly-vinylalcohol, or sugars; and polyamines such as ethylene diamine, diethylene triamine, triethylene tetramine, polyethylene imine, or polypropylene diamine.

The compound group X further includes: a substituted or unsubstituted alkylene chain having 4 or less carbon atoms, such as a methylene group, an ethylene group, a propylene group or a butylene group; and a functional group having a saturated or unsaturated hetero ring such as a pyridine ring, an imidazole ring, a pyrazine ring, a piperidine ring, a piperazine ring or a morpholine ring.

Among these, the linking group Q is preferably a residue of polyols including an oxyalkylene group (preferably, an oxyethylene group), and particularly preferably a residue of polyols including three or more oxyalkylene groups (preferably, oxyethylene groups).

Specific examples of the water-soluble polymerizable compound having an acrylamide structure in the molecule thereof include the following water-soluble polymerizable compounds.

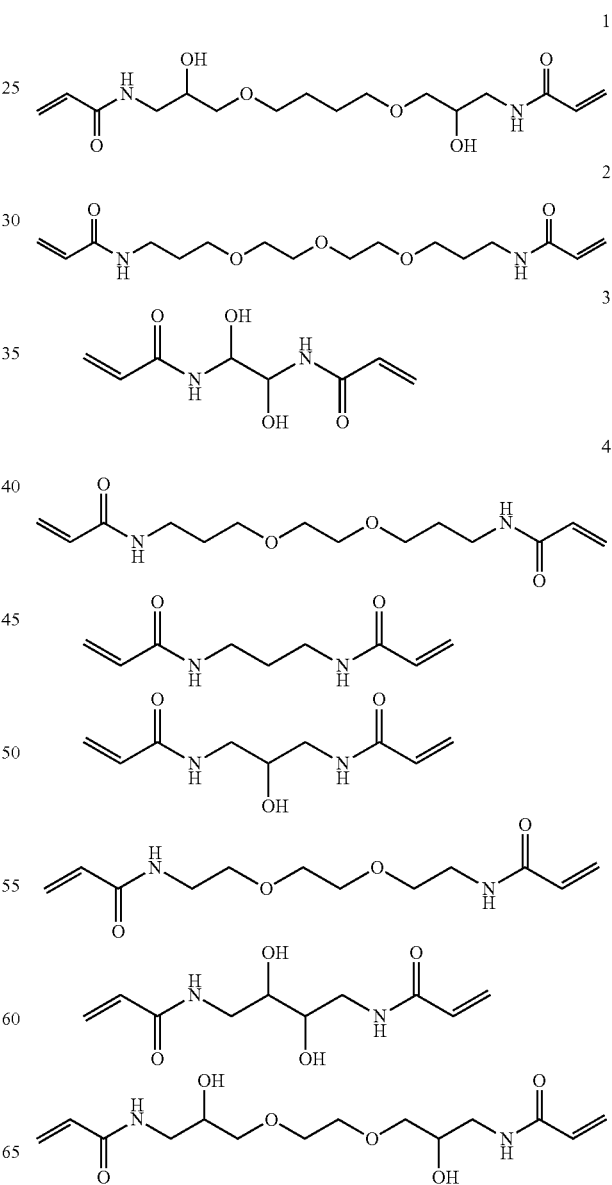

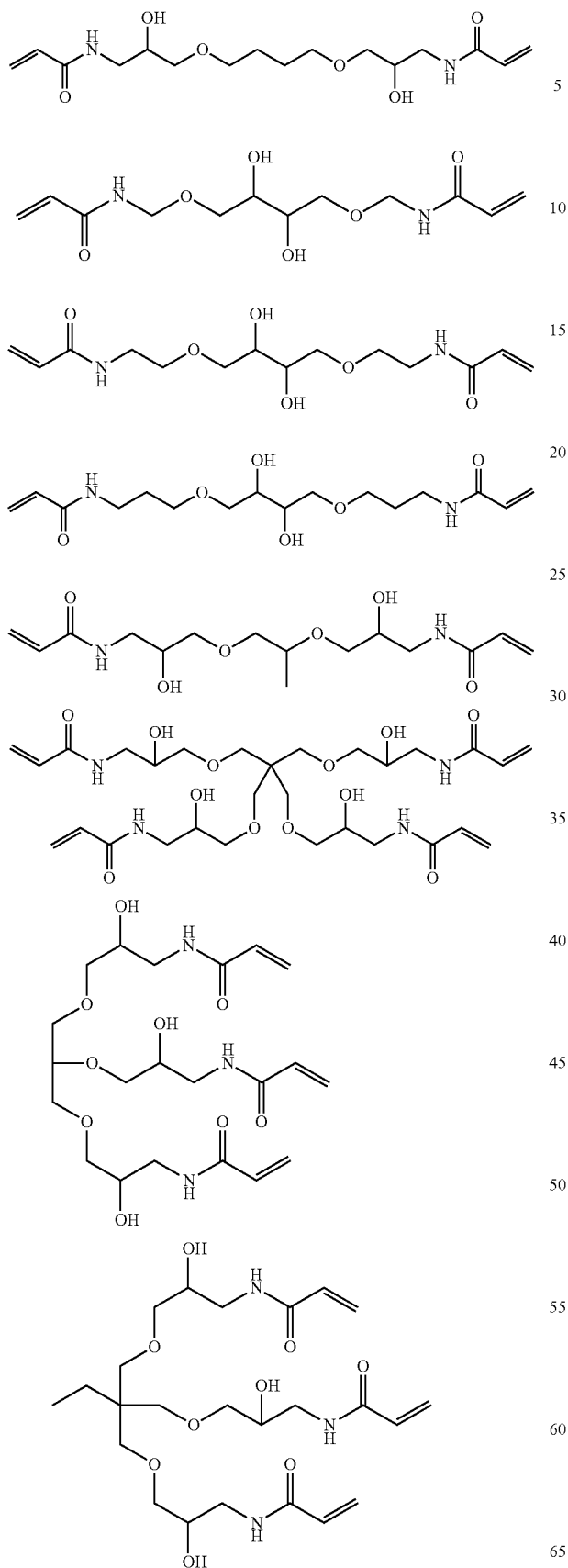

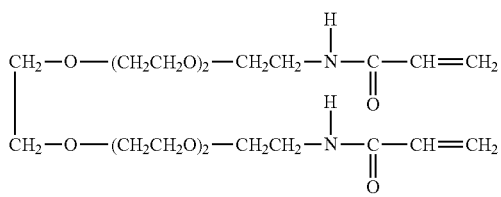

(a)

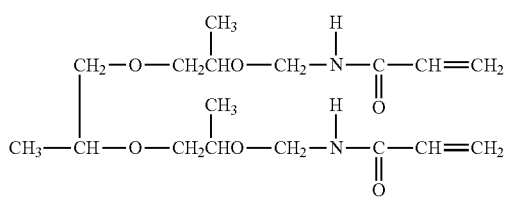

(b)

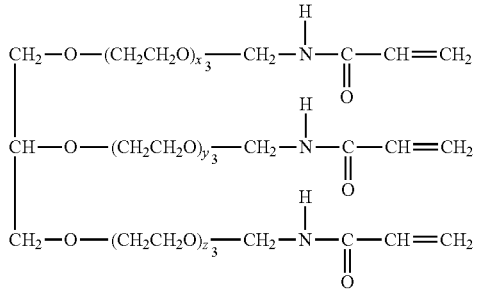

$x_3 + y_3 + z_3 = 6$ (c)

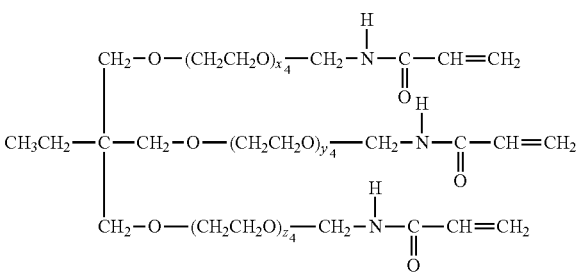

$x_4 + y_4 + z_4 = 9$ (d)

The polymerizable compound may be used alone or in combination of two or more kinds thereof.

The content of the polymerizable compound in the ink composition is preferably from 5% by mass to 50% by mass with respect to the total mass of the ink composition, more preferably from 10% by mass to 30% by mass, and most preferably from 15% by mass to 25% by mass.

Water

The ink composition of the present invention includes water and, as necessary, at least one kind of water-soluble organic solvent to be described later.

The water used in the ink composition of the present invention is desirably free of ionic impurities such as ion-exchanged water or distilled water. The content of water in the ink composition is appropriately selected in accordance with purposes, but is generally preferably from 10% by mass to 95% by mass and more preferably from 30% by mass to 90% by mass.

Polymerization Initiator

The ink composition of the present invention includes at least one kind of polymerization initiator as a component thereof. In the present invention, a known polymerization initiator is usable. The polymerization initiator of the present invention is preferably a radical polymerization initiator.

Examples of the radical polymerization initiator that is preferably used in the present invention include: (a) aromatic ketones; (b) acylphosphine compounds; (c) aromatic onium salt compounds; (d) organic peroxides; (e) thio compounds; (f) hexaallyl biimidazole compounds; (g) ketoxime ester compounds; (h) borate compounds; (i) azinium compounds; (j) metallocene compounds; (k) active ester compounds; (l) compounds having a carbon to halogen bonding; and (m) alkylamine compounds.

Specific examples of the polymerization initiator include a polymerization initiator that is described on pages 65 to 148 of "Shigaisen Koka System (UV radiation curing system)" authored by Kiyoshi Kato (published by Sogo Gijutsu Senta KK, 1989).

In the invention, a water-soluble polymerization initiator or the like can be used as the polymerization initiator. In the present specification, the term "water-soluble" means that the polymerization initiator dissolves in distilled water at 25° C. in an amount of 0.5% by mass or more. The water-soluble polymerization initiator preferably dissolves in distilled water in an amount of preferably 1% by mass or more, and more preferably 3% by mass or more.

The radical polymerization initiator may be used alone or two or more kinds in combination. The content of the polymerization initiator in the ink composition of the present invention is preferably from 0.1% by mass to 30% by mass, more preferably from 0.5% by mass to 20% by mass, and still more preferably from 1.0% by mass to 15% by mass in terms of solid content.

Pigment

The ink composition of the present invention includes at least one kind of pigment. The pigment is not particularly limited, and may be selected appropriately in accordance with purposes. For instance, the pigment may be either organic or inorganic. The pigment is desirably insoluble or sparingly soluble in water from the viewpoint of an ability of coloring the ink.

The type of the pigment is not particularly limited, and known organic and inorganic pigments are usable.

Examples of the organic pigments include: azo pigments; polycyclic pigments; dye chelates; nitro pigments; nitroso pigments; and aniline black. Among these, azo pigments, polycyclic pigments, and the like are more preferable. Examples of the azo pigments include: azo lakes; insoluble azo pigments; condensed azo pigments; and chelate azo pigments. Examples of the polycyclic pigments include: phthalocyanine pigments; perylene pigments; perinone pigments; anthraquinone pigments; quinacridone pigments; dioxazine pigments; indigo pigments; thioindigo pigments; isoindolinone pigments; and quinophthalone pigments. Examples of the dye chelates include: basic dye chelates and acidic dye chelates.

Examples of the inorganic pigments include: titanium oxide; iron oxide; calcium carbonate; barium sulfate; aluminum hydroxide; barium yellow; cadmium yellow; chrome yellow; and carbon black. Among these, carbon black is particularly preferable.

The carbon black may be produced by a known process such as a contact process, a furnace process or a thermal process.

Specific examples of the pigments usable in the present invention include a pigment that is described in paragraph numbers [0142] to [0145] of Japanese Patent Application Laid-Open (JP-A) No. 2007-100071.

The pigments may be used alone or as a combination of two or more kinds that are selected from the same or different pigment groups described above.

The content of the pigment in the ink composition is preferably from 1% by mass to 25% by mass, and more preferably from 2% by mass to 20% by mass, with respect to the total mass of the ink composition, from the viewpoint of color density, granularity, ink stability, and ejection reliability.

Water-Soluble Organic Solvent

The ink composition of the present invention may include at least one kind of water-soluble organic solvent.

Examples of the water-soluble organic solvent include: alkane diols (polyols) such as glycerin, ethylene glycol, and propylene glycol; sugar alcohols; alkylalcohols having from 1 to 4 carbon atoms such as ethanol, methanol, butanol, propanol, or isopropanol; and glycol ethers such as ethyleneglycol monomethylether, ethyleneglycol monoethylether, ethyleneglycol monobutylether, ethyleneglycol monomethyletheracetate, diethyleneglycol monomethylether, diethyleneglycol monoethylether, diethyleneglycol mono-n-propylether, ethyleneglycol mono-iso-propylether, diethyleneglycol mono-iso-propylether, ethyleneglycol mono-n-butylether, ethyleneglycol mono-t-butylether, diethyleneglycol mono-t-butylether, triethyleleglycol monoethylether, 1-methyl-1-methoxybutanol, propyleneglycol monomethylether, propyleneglycol monoethylether, propyleneglycol mono-t-butylether, propyleneglycol mono-n-propylether, propyleneglycol mono-iso-propylether, dipropyleneglycol, dipropyleneglycol monomethylether, dipropyleneglycol monoethylether, dipropyleneglycol mono-n-propylether, dipropyleneglycol mono-iso-propylether, or tripropyleneglycol monomethylether. These may be used in a manner of one kind alone or two or more kinds in combination.

For the purpose of preventing drying, polyols are useful. Examples of the polyols include: glycerin; ethylene glycol; diethylene glycol; triethylene glycol; propylene glycol; dipropylene glycol; tripropylene glycol; 1,3-butanediol; and 2,3-butanediol. These may be used alone or two or more kinds in combination.

For the purpose of promoting the permeation, polyol compounds are preferable, and aliphatic diols are suitable. Examples of the aliphatic diols include: 2-ethyl-2-methyl-1,3-propanediol; 3,3-dimethyl-1,2-butanediol; 2-ethyl-1,3-hexanediol; and 2,2,4-trimethyl-1,3-pentanediol. Among these, 2-ethyl-1,3-hexanediol and 2,2,4-trimethyl-1,3-pentanediol are preferable.

The water-soluble organic solvent used in the present invention preferably includes at least one kind of compound represented by the following structural formula (1), from the viewpoint of suppressing curling of a recording medium.

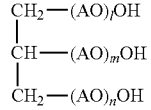

structural formula (1)

In structural formula (1), each of l, m and n independently represents an integer of 1 or more, and l+n+m=3 to 15. The value of l+m+n is preferably from 3 to 12, more preferably from 3 to 10. When the value of l+m+n is 3 or more, curling of a recording medium can be favorably suppressed. When the value is 15 or less, favorable ejection property may be obtained. In structural formula (1), AO represents ethyleneoxy (EO) and/or propyleneoxy (PO). Among these, a propyleneoxy group is preferable. Each of AO in $(AO)_l$, $(AO)_m$, and $(AO)_n$ may be the same or different from each other.

The following are exemplary compounds represented by structural formula (1), but the invention is not limited to these compounds. In the exemplary compounds, the description "POP(3) glycerylether" means a glycerylether in which three propyleneoxy groups in total are bonded to glycerin, and the same also applies to the other cases.

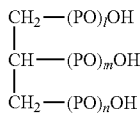

l+m+n=3 POP(3) glycerylether
l+m+n=4 POP(4) glycerylether
l+m+n=5 POP(5) glycerylether
l+m+n=6 POP(6) glycerylether
l+m+n=7 POP(7) glycerylether Furthermore, from the viewpoint of suppressing curling of a recording medium, the following water-soluble organic solvents are also preferably used in the invention.

n-$C_4H_9O(AO)_4$—H (AO=EO or PO, the ratio of EO:PO=1:1);
n-$C_4H_9O(AO)_{10}$—H (AO=EO or PO, the ratio of EO:PO=1:1);
$HO(AO)_{40}$—H (AO=EO or PO, the ratio of EO:PO=1:3);
$HO(AO)_{55}$—H (AO=EO or PO, the ratio of EO:PO=5:6);
$HO(PO)_3$—H;
$HO(PO)_7$—H; and
1,2-hexanediol.

In the present invention, the water-soluble organic solvent may be used in a manner of one kind alone or two or more kinds in a mixture.

The content of the water-soluble organic solvent in the ink is preferably 60% by mass or less and more preferably 40% by mass or less.

Dispersant

The pigment is preferably in the form of color particles dispersed in a water-based solvent with a dispersant. The dispersant may be a polymer dispersant or a low-molecular-weight surfactant-type dispersant. The polymer dispersant may be either a water-soluble polymer dispersant or a water-insoluble polymer dispersant.

In the present invention, the water-insoluble polymer dispersant is preferable from the viewpoint of dispersion stability and ejection property when the ink composition is used for inkjet printing.

Water-Insoluble Polymer Dispersant

The water-insoluble polymer dispersant (hereinafter, simply referred to as a "dispersant" in some cases) used in the present invention is not particularly limited as long as it is a water-insoluble polymer capable of dispersing a pigment, and known water-insoluble polymer dispersants are usable. The water-insoluble polymer dispersant may be composed of, for example, a hydrophobic structural unit and a hydrophilic structural unit.

Examples of a monomer that forms the hydrophobic structural unit include: a styrene-family monomer; an alkyl(meth)acrylate; and a (meth)acrylate that contains an aromatic group.

The monomer that forms the hydrophilic structural unit is not particularly limited as long as it includes a hydrophilic group. Examples of the hydrophilic group include: a nonionic group; a carboxyl group; a sulfonic acid group; and a phosphoric acid group. Examples of the nonionic group include: a hydroxyl group; an amide group (in which the nitrogen atom is not substituted); a group derived from an alkyleneoxide polymer (for instance, polyethylene oxide, polypropylene oxide, or the like); and a group derived from sugar alcohol.

From the viewpoint of dispersion stability, the hydrophilic structural unit preferably includes at least a carboxyl group. A hydrophilic structural unit including both a nonionic group and a carboxyl group is also preferable.

Specific examples of the water-insoluble polymer dispersant used in the present invention include: a copolymer of styrene and (meth)acrylic acid; a copolymer of styrene, (meth)acrylic acid and (meth)acrylic acid ester; a copolymer of (meth)acrylic acid ester and (meth)acrylic acid; a copolymer of polyethyleneglycol(meth)acrylate and (meth)acrylic acid; and a copolymer of styrene and maleic acid.

In the present specification, the term "(meth)acrylic acid" denotes acrylic acid or methacrylic acid.

The water-insoluble polymer dispersant used in the present invention is preferably a vinyl polymer containing a carboxyl group, from the viewpoint of pigment dispersion stability. More preferably, the dispersant is a vinyl polymer that has, as the hydrophobic structural unit, at least a structural unit derived from a monomer that contains an aromatic group and, as the hydrophilic structural unit, a structural unit including a carboxyl group.

The weight average molecular weight of the water-insoluble polymer dispersant is preferably from 3,000 to 200,000 from the viewpoint of pigment dispersion stability, more preferably from 5,000 to 100,000, still more preferably from 5,000 to 80,000, and particularly preferably from 10,000 to 60,000.

The content of the dispersant in the color particles of the present invention is, from the viewpoint of pigment dispersability, ink coloring property and dispersion stability, preferably from 10% by mass to 100% by mass with respect to pigments, more preferably from 20% by mass to 70% by mass, and particularly preferably from 30% by mass to 60% by mass.

When the content of the dispersant in the color particles is within the above range, the pigment is coated with an appropriate amount of the dispersant, whereby color particles having a small particle size and an excellent temporal stability may be easily obtained.

The color particles used in the present invention may include a dispersant other than the above, in addition to the water-insoluble polymer dispersant. For instance, conventionally known water-soluble low-molecular-weight dispersants or water-soluble polymers may be used. The content of the dispersant other than the water-insoluble polymer dispersant may be within the range of the content of the water-insoluble dispersant mentioned above.

The color particles used in the present invention preferably includes the pigment and the water-insoluble polymer dispersant from the viewpoint of dispersion stability and ejection stability. It is more preferred that at least part of the surface of the pigment be covered with the water-insoluble polymer dispersant. Such color particles may be obtained, for instance, in the form of a color particle dispersion by dispersing a mixture of a pigment, a dispersant, optionally a solvent (preferably an organic solvent), and others with a dispersing machine.

For instance, the color particle dispersion may be produced in the form of a dispersion through a process that includes a step of adding an aqueous solution that contains a basic substance to a mixture of the pigment, the water-insoluble polymer dispersant, and an organic solvent for dissolving or dispersing the dispersant (a mixing-and-hydration step). Subsequently, a dispersion is obtained by a step of removing the organic solvent (a solvent-removing step). Through these processes, the coloring agent (pigment) is finely dispersed, whereby a dispersion of color particles that have excellent storage stability is prepared.

The organic solvent is required to dissolve or disperse the dispersant, but also preferably has a certain degree of affinity to water. Specifically, a preferred organic solvent has a solubility of from 10% by mass to 50% by mass in water at 20° C.

More specifically, the dispersion of the color particles may be produced through a process that includes the following step (1) and step (2), but the process is not limited thereto.

Step (1): performing a dispersion treatment of a mixture of a pigment, a dispersant, an organic solvent that dissolves or disperses the dispersant, and a solution that contains water as a main component and a basic substance.

Step (2): removing at least part of the organic solvent from the mixture after the dispersing treatment.

In step (1), firstly, the dispersant is dissolved or dispersed in an organic solvent to obtain a mixture (a mixing step). Secondly, a solution that contains water as a main component, a coloring agent and a basic substance, water, and when needed a surfactant, and the like are added to the mixture, which is then mixed and dispersed to obtain an oil-in-water dispersion.

The basic substance is used to neutralize an anionic group (preferably, a carboxyl group) that may be included in a polymer. The neutralization degree of the anionic group is not particularly limited, but the finally obtained dispersion of colorant particles preferably has a liquid property of pH 4.5 to 10. The pH may also be determined in accordance with a desired neutralization degree of the polymer.

Preferred examples of the organic solvent include: an alcohol solvent; a ketone solvent; and an ether solvent. Among these, examples of the alcohol solvent include: ethanol; isopropanol; n-butanol; tert-butanol; isobutanol; and diacetone alcohol. Examples of the ketone solvent include: acetone; methylethyl ketone; diethyl ketone; and methylisobutyl ketone. Examples of the ether solvent include: dibutylether; tetrahydrofuran; and dioxane. Among these solvents, isopropanol, acetone, and methylethyl ketone are preferable, and methylethyl ketone is particularly preferable. The organic solvent may be used alone or as a combination of two or more kinds.

In the production of the color particle dispersion, a kneading-dispersing treatment may be performed while a strong shearing force is applied with a twin roll mill, a triple roll mill, a ball mill, a tron mill, a disper mill, a kneader, a cokneader, a homogenizer, a blender, or a uni- or bi-axial extruder. Details of the kneading and dispersing are described in "Paint Flow and Pigment Dispersion" by T. C. Patton (published by John Wiley and Sons, 1964).

Further, when needed, the color particle dispersion may be obtained by performing a fine dispersing treatment. In this treatment, a vertical or horizontal sand grinder, a pin mill, a slit mill, an ultrasonic dispersing machine, or the like is used along with beads that are made of glass, zirconia, or the like and have a particle size of from 0.01 mm to 1 mm.

The process of removing the organic solvent in the production of the color particle dispersion used in the present invention is not particularly limited, and the organic solvent may be removed by a known process such as vacuum distillation.

The color particles in the color particle dispersion thus obtained keep an appropriate dispersing state, and in addition to that, the color particle dispersion thus obtained exhibits an excellent temporal stability.

The volume average particle size of the coloring agent (or color particles) used in the present invention is preferably from 10 nm to 200 nm, more preferably from 10 nm to 150 nm, and still more preferably from 10 nm to 100 nm. When the volume average particle size is 200 nm or less, appropriate color reproducibility is obtained. In the case of an inkjet process, appropriate droplet ejection properties are obtained. When the volume average particle size is 10 nm or more, appropriate light resistance is obtained.

The particle size distribution of the coloring agent (or color particles) is not particularly limited, and the color particles may have a broad particle size distribution or a mono-dispersed distribution. Two or more kinds of coloring agents having different mono-dispersed particle size distributions may be used in combination.

The volume average particle size and the particle size distribution of the coloring agent (or color particles) may be measured by using a light scattering process, for instance.

In the present invention, the coloring agent (or color particles) may be used alone or as a combination of two or more kinds.

Resin Particles

The ink composition of the present invention may include resin particles as a component when needed.

The resin particles preferably have a function of aggregating themselves or making the dispersing state thereof unstable and increasing ink viscosity so as to fix an ink composition, that is, an image, when the resin particles contact the aforementioned treatment liquid or a region onto which the treatment liquid has been applied and dried. The resin particles are preferably dispersed in at least one selected from water and an organic solvent.

The resin particles may be formed from an acryl resin, a vinylacetate resin, a styrene-butadiene resin, a vinylchloride resin, an acryl-styrene resin, a butadiene resin, a styrene resin, a cross-linked acryl resin, a cross-linked styrene resin, a benzo guanamine resin, a phenol resin, a silicone resin, an epoxy resin, an urethane resin, a paraffin resin, a fluoro resin, or the like, or a latex of these resins. Preferred examples thereof include: an acrylic resin, an acryl-styrene resin, a styrene resin, a cross-linked acryl resin, and a cross-linked styrene resin.

The resin particles may be in the form of a latex.

The weight average molecular weight of the resin particles is preferably from 10,000 to 200,000 and more preferably from 20,000 to 200,000.

The average particle size of the resin particles is preferably from 1 nm to 1 μm, more preferably from 1 nm to 200 nm, still more preferably from 1 nm to 100 nm, and particularly preferably from 1 nm to 50 nm.

The glass transition temperature (Tg) of the resin particles is preferably 30° C. or higher, more preferably 40° C. or higher, and still more preferably 50° C. or higher.

The addition amount of the resin particles with respect to ink is preferably from 0.1% by mass to 20% by mass, more preferably from 0.1% by mass to 15% by mass, and still more preferably from 0.1% by mass to 10% by mass.

The particle size distribution of the resin particles is not particularly limited, and the resin particles may have a broad particle size distribution or a mono-dispersed particle size distribution. Two or more kinds of resin particles having different mono-dispersed particle size distributions may be used in combination.

Surfactant

The ink composition of the present invention may include at least one kind of surfactant as a component thereof, when needed. The surfactant may be used as a surface tension conditioner.

As the surface tension conditioner, a compound that has both a hydrophilic portion and a hydrophobic portion in the molecule is effectively used. Any of an anionic surfactant, a cationic surfactant, an amphoteric surfactant, a nonionic surfactant, and a betaine surfactant may be used. In addition, the aforementioned dispersant (polymer dispersant) may be used as the surfactant.

In the present invention, from the viewpoint of preventing ink dots from interfering with each other, a nonionic surfactant is preferable. Among the nonionic surfactant, an acetylene glycol derivative is more preferable.

When the surfactant (surface tension conditioner) is incorporated in an ink composition, the surfactant is incorporated in such an amount that the surface tension of the ink composition is adjusted within a range of preferably from 20 mN/m to 60 mN/m from the viewpoint of favorably performing the ejection of the ink composition by an inkjet process. From the viewpoint of surface tension, the range is more preferably from 20 mN/m to 45 mN/m and still more preferably from 25 mN/m to 40 mN/m.

The amount of the surfactant in the ink composition is not particularly limiter, except that the aforementioned range of the surface tension is preferred, but is preferably 0.1% by mass or more, more preferably from 0.1% by mass to 10% by mass, and still more preferably from 0.2% by mass to 3% by mass.

Other Components

In addition to the aforementioned components, the ink composition may further include various kinds of additives as the other components when needed.

Examples of the various kinds of additives include known additives such as a UV light absorber, an anti-fading agent, an anti-mold agent, a pH conditioner, an anti-corrosion agent, an anti-oxidation agent, an emulsion stabilizer, a preservative, an anti-foaming agent, a viscosity improver, a dispersion stabilizer, or a chelating agent.

Examples of the UV light absorber include: a benzophenone UV light absorber; a benzotriazole UV light absorber; a salicylate UV light absorber; a cyanoacrylate UV light absorber; and a nickel complex salt UV light absorber.

As the anti-fading agent, various kinds of organic and metal complex anti-fading agents may be used. Examples of the organic anti-fading agents include: hydroquinones; alkoxyphenols; dialkoxyphenols; phenols; anilines; amines; indans; chromanes; alkoxyanilines; and hetero rings. Examples of the metal complex include: a nickel complex; and a zinc complex.

Examples of the anti-mold agent include: sodium dehydroacetate; sodium benzoate; odium pyridinethione-1-oxide; p-hydroxy benzoic acid ethylester; 1,2-benzisothiazolin-3-on; sodium sorbiate; and sodium pentachlorophenol.

The content of the anti-mold agent in the ink composition is preferably from 0.02% by mass to 1.00% by mass.

The pH conditioner is not particularly limited as long as it can control the pH to a desired value without bringing an adverse effect to the ink composition. The pH conditioner may be selected appropriately in accordance with purposes. Examples of the pH conditioner include: alcoholamines (for instance, diethanolamine, triethanolamine, 2-amino-2-ethyl-1,3-propanediol, or the like); alkali metal hydroxides (for instance, lithium hydroxide, sodium hydroxide, potassium hydroxide, or the like); ammonium hydroxides (for instance, ammonium hydroxide, quaternary ammonium hydroxide, or the like); phosphonium hydroxides; and alkali metal carbonates.

Examples of the anti-corrosion agent include: acidic sulfites; sodium thiosulfate; ammonium thiodiglycolate; diisopropyl ammonium nitrite; pentaerythritol tetra nitrate; and dicyclohexyl ammonium nitrite.

Examples of the anti-oxidation agent include: a phenol anti-oxidation agent (including a hindered phenol anti-oxidation agent); an amine anti-oxidation agent; a sulfur anti-oxidation agent; and a phosphoric acid anti-oxidation agent.

Examples of the chelating agent include: sodium ethylenediamine tetra-acetic acid; sodium nitrilotriacetic acid; sodium hydroxyethyl ethylenediamine triacetic acid; diethylene triamine penta-acetic acid; and sodium uramyl diacetic acid.

Ink Composition Properties

The ink composition of the present invention has a surface tension (25° C.) of preferably from 20 mN/m to 60 mN/m, more preferably from 20 mN/m to 45 mN/m, and still more preferably from 25 mN/m to 40 mN/m.

The surface tension is measured with an automatic surface tensiometer (CBVP-Z, trade name, manufactured by KYOWA INTERFACE SCIENCE CO., LTD.) under the condition that the temperature of the ink composition is 25° C.

The ink composition of the present invention has a viscosity of preferably from 1.2 mPa·s to 15.0 mPa·s at 25° C., more preferably 2 mPa·s or more and less than 13 mPa·s, and still more preferably 2.5 mPa·s or more and less than 10 mPa·s.

The viscosity is measured with a viscometer (VISCOMETER TV-22, trade name, manufactured by TOKI SANGYO CO., LTD.) while an ink composition to be measured is conditioned at 25° C.

Treatment Liquid

The ink composition of the present invention may be used as an ink set in combination with a treatment liquid that contains an aggregating agent that aggregates the components contained in the ink composition. The treatment liquid includes at least an aggregating agent that aggregates the components of the ink composition, and as necessary, the treatment liquid may include other components. By using the treatment liquid in combination with the ink composition, the speed of inkjet recording can be increased, and an image with excellent image density or resolution (for instance, excellent reproducibility of fine lines or fine portions) can be obtained even when the recording is performed at high speed.

By incorporating an aggregating agent in the treatment liquid, an image having an excellent image quality and an excellent anti-blocking property can be formed.

Aggregating Agent

The treatment liquid includes an aggregating agent that aggregates the components of the ink composition. The aggregating agent functions as a fixing agent that can aggregate (fix) the ink composition upon contact with the ink composition on the recording medium. For instance, when the ink composition is discharged on a recording medium (preferably a coating paper) on which an aggregating agent exists, the ink composition contacts the treatment liquid and the components in the ink composition are allowed to aggregate and fixed on the recording medium.

Examples of the component for fixing the components contained in the ink composition include: an acidic compound; a cationic polymer; and a polyvalent metal salt. These may be used alone or as a combination of two or more kinds.

Acidic Compound

Preferred examples of the acidic compound include: sulfuric acid; hydrochloric acid; nitric acid; phosphoric acid; polyacrylic acid; acetic acid; glycolic acid; malonic acid;

malic acid; maleic acid; ascorbic acid; succinic acid; glutaric acid; fumaric acid; citric acid; tartaric acid; lactic acid; sulfonic acid; ortho-phosphoric acid; meta-phosphoric acid; pyrrolidone carboxylate; pyrone carboxylate; pyrrole carboxylate; furan carboxylate; pyridine carboxylate; coumaric acid; thiophene carboxylate; nicotinic acid; a derivative thereof; and a salt thereof.

Among these, an acidic compound having high water solubility is preferable. In addition, from the viewpoint of reacting with the ink composition and fixing the entire ink, an acidic compound having a valency of trivalent or less is preferable. An acidic compound having a valency of from divalent to trivalent is particularly preferable.

The acidic compound may be used alone or two or more kinds in combination.

When the treatment liquid contains an acidic compound, the pH (25° C.) of the treatment liquid is preferably from 0.1 to 6.8, more preferably from 0.5 to 6.0, and still more preferably from 0.8 to 5.0.

The content of the acidic compound is preferably 40% by mass or less with respect to the total mass of the treatment liquid, and more preferably from 15% by mass to 40% by mass. When the content of the acidic compound is from 15% by mass to 40% by mass, the components contained in the ink composition may be more efficiently fixed.

Furthermore, the content of the acidic compound is preferably from 15% by mass to 35% by mass with respect to the total mass of the treatment liquid.

Polyvalent Metal Salt

The polyvalent metal salt used in the present invention is a compound that contains a metal having a valency of divalent or more such as an alkaline earth metal or a zinc-family metal. Examples of the salt include an acetic acid salt or an oxide of a metal ion such as $Ca^{2+}$, $Cu^{2+}$, or $Al^{3+}$.

In the present invention, the aggregation reaction, which occurs when the ink composition is ejected onto a recording medium on which the treatment liquid that contains the polyvalent metal salt has been applied, may be accomplished by way of decreasing the dispersion stability of particles such as resin particles or coloring agents such as a pigment, and increasing the viscosity of the entire ink composition. For instance, when particles such as resin particles or pigments contained in the ink composition have a week acidic functional group such as a carboxyl group, these particles are dispersed stably by an action of the weak acidic functional group, but the stably dispersed state of the particles can be reduced by decreasing the surface charge of the particles through interaction with the polyvalent metal salt. Therefore, considering the aggregation reaction, the polyvalent metal salt, which is contained in the treatment liquid and serves as a fixing agent, is required to have a valency of divalent or more, namely, polyvalent. From the viewpoint of aggregation reactivity, a polyvalent metal salt that includes a polyvalent metal ion having a valency of trivalent or more is preferable.

From the aforementioned viewpoint, the polyvalent metal salt usable for the treatment liquid of the present invention is preferably at least one kind selected from the group consisting of a salt formed from a polyvalent metal ion and an anion, polyaluminum hydroxide, and polyaluminum chloride.

Examples of the polyvalent metal ion include: $Ca^{2+}$; $Cu^{2+}$; $Ni^{2+}$; $Mg^{2+}$; $Sr^{2+}$; $Zn^{2+}$; $Ba^{2+}$; $Al^{3+}$; $Fe^{3+}$; $Cr^{3+}$; $Co^{3+}$; $Fe^{2+}$; $La^{3+}$; $Nd^{3+}$; $Y^{3+}$; and $Zr^{4+}$. These polyvalent metal ions can be included in the treatment liquid by using a salt thereof.

The salt denotes a metal salt formed from a polyvalent metal ion as mentioned above and an anion that combines with the polyvalent metal ion. The salt is preferably soluble in a solvent. The solvent denotes a medium that forms the treatment liquid along with the polyvalent metal salt. Examples of the solvent include: water; and an organic solvent that will be described later.

Examples of a preferred anion that is used to form the salt with the polyvalent metal ion include: $Cl^-$; $NO_3^-$; $I^-$; $Br^-$; $ClO_3^-$; $CH_3COO^-$; and $SO_4^{2-}$.

The polyvalent metal ion and the anion for forming the salt of a polyvalent metal ion and an anion may be one or plural kinds, respectively.

Examples of a polyvalent metal salt other than the above include polyaluminum hydroxide and polyaluminum chloride.

In the present invention, from the viewpoint of reactivity, coloring property, ease of handling, and others, it is preferable to use a salt of a polyvalent metal ion and an anion. The polyvalent metal ion is preferably at least one kind selected from the group consisting of $Ca^{2+}$, $Mg^{2+}$, $Sr^{2+}$, $Al^{3+}$, and $Y^{3+}$, and more preferably $Ca^{2+}$.

The anion is particularly preferably $NO_3^-$ from the viewpoint of solubility.

The polyvalent metal salt may be used alone or as a combination of two or more kinds.

The content of the polyvalent metal salt is 15% by mass or more with respect to the total mass of the treatment liquid. When the content of the polyvalent metal salt is 15% by mass or more, the components contained in the ink composition may be fixed more effectively.

The content of the polyvalent metal salt is preferably from 15% by mass to 35% by mass with respect to the total mass of the treatment liquid.

The amount of the polyvalent metal salt applied onto a recording medium is not particularly limited as long as it is enough to aggregate the ink composition, but is preferably from 0.5 $g/m^2$ to 4.0 $g/m^2$ and more preferably from 0.9 $g/m^2$ to 3.75 $g/m^2$ from the viewpoint of promoting the fixation of the ink composition.

Cationic Polymer

The cationic polymer is at least one kind selected from the group consisting of a poly(vinylpyridine) salt, a polyalkyl aminoethyl acrylate, a polyalkyl aminoethyl methacrylate, poly(vinylimidazole), polyethyleneimine, polybiguanide, and polyguanide.

The cationic polymer may be used alone or as a combination of two or more kinds.

Among the above cationic polymers, polyguanide (preferably, poly(hexamethylene guanidine) acetate, polymonoguanide, and polymeric biguanide), polyethyleneimide, and poly(vinylpyridine), which are advantageous from the viewpoint of aggregation speed, are preferable.

The cationic polymer, preferably has a small weight average molecular weight from the viewpoint of the viscosity of the treatment liquid. The weight average molecular weight is preferably in the range of 500 to 500,000, more preferably in the range of 700 to 200,000, and still more preferably in the range of 1,000 to 100,000, when the treatment liquid is applied by an inkjet method. A weight average molecular weight of 500 or more is advantageous from the viewpoint of aggregation speed. A weight average molecular weight of 500,000 or less is advantageous from the viewpoint of ejection reliability. However, when the treatment liquid is applied by a process other than the inkjet method, the weight average molecular weight is not limited to the above.

The treatment liquid may include a cationic polymer, and the pH (25° C.) of the treatment liquid is preferably from 1.0 to 10.0, more preferably from 2.0 to 9.0, and still more preferably from 3.0 to 7.0.

The content of the cationic polymer is preferably from 1% by mass to 35% by mass and more preferably from 5% by mass to 25% by mass with respect to the total mass of the treatment liquid.

The application amount of the cationic polymer onto a recording medium is not particularly limited as long as it is enough to stabilize the ink composition, but is preferably from 0.5 g/m$^2$ to 4.0 g/m$^2$ and more preferably from 0.9 g/m$^2$ to 3.75 g/m$^2$ from the viewpoint of promoting the fixation of the ink composition.

Image Forming Process

The image forming process of the present invention, in which the ink set of the present invention is used, includes:

an ink application step in which an ink composition is applied onto a recording medium by inkjetting; and a treatment liquid application step in which a treatment liquid is applied onto the recording medium.

The ink composition includes a pigment, water, a polymerizable compound having an acrylamide structure, a polymerization initiator, and a wetting agent that is in a solid state under the normal conditions. The amount of the wetting agent with respect to the amount of the polymerizable compound having an acrylamide structure is 0.01% by mass to 400% by mass. The treatment liquid includes an aggregating agent that aggregates the components of the ink composition. The image forming process of the present invention may include the other steps when needed.

Hereinafter, respective steps that are included in the image forming process of the present invention will be described.

Ink Application Step

In the ink application step, an ink composition is applied onto a recording medium by inkjetting. The ink composition includes a pigment, water, a polymerizable compound having an acrylamide structure, a polymerization initiator, and a wetting agent that is in a solid state under the normal conditions. The amount of the wetting agent with respect to the amount of the polymerizable compound having an acrylamide structure is 0.01% by mass to 400% by mass. In this step, the ink composition may be applied selectively onto a recording medium to form a desired visual image. Details of the ink composition, including exemplary embodiments thereof, are described above.

Specifically, recording of an image by inkjetting is performed by ejecting a liquid composition onto a desired recording medium by applying energy. The recording medium may be plane paper; resin-coated paper; inkjet paper as described in JP-A Nos. 8-16917, 8-27693, 2-276670, 7-276789, 9-323475, 62-238783, 10-153989, 10-217473, 10-235995, 10-337947, 10-217597, and 10-337947; films; electrophotographic common use paper; cloth; glass; metal; or china. As a preferred inkjet recording process used in the present invention, a process described in paragraph numbers from 0093 to 0105 in JP-A No. 2003-306623 is usable.

The inkjet process is not particularly limited, and any known system may be applied. Examples of the known systems include: a charge control system where an ink is ejected with an electrostatic attraction force; a drop on demand system (a pressure pulse system) where a pressure vibration generated by a piezo element is used; an acoustic inkjet system where an electrical signal is converted into an acoustic beam, and an ink is ejected with a radiation pressure that is accompanied by irradiation of the acoustic beam onto the ink; and a thermal inkjet system ("BUBBLE JET" (trade name)) where an ink is heated to generate bubbles, and pressure accompanied by the generation of bubbles is used. As the inkjet process, particularly an inkjet system described in JP-A No. 54-59936 may be effectively used, wherein an ink that has received an action of thermal energy causes an explosive volume change and then the ink is ejected from nozzles with an acting force accompanied by the explosive volume change.

The inkjet process includes: a system where an ink called a low concentration photo ink is ejected with a small volume in many times or drops; a system where a number of inks having substantially same color and different concentration from each other are used to improve image quality; and a system where a colorless transparent ink is used.

An inkjet head that is used in the inkjet process may employ an on-demand system or a continuous system. Further, specific examples of an ejection system include: an electrical to mechanical converting system (for instance, a single cavity type, a double cavity type, a bender type, a piston type, a share mode type, a shared wall type, and the like); an electrical to thermal converting system (for instance, a thermal inkjet type, a "BUBBLE JET" (trade name) type, and the like; an electrostatic attraction system (for instance, an electric field control type, a slit jet type, and the like); and a discharge system (for instance, a spark jet type and the like). Any of the above ejection systems may be used.

The ink nozzle or the like used for recording by an inkjet system is not particularly limited, and may be selected appropriately in accordance with purposes.

Specific examples of the inkjet recording process are described below.

(1) a method in which ink droplets are continuously ejected from a nozzle while a strong electric field is applied between the nozzle and an acceleration electrode placed in front of the nozzle; and while the ink droplets pass between deflection electrodes, a print data signal is applied to the deflection electrodes, whereby the ink droplets fly toward a recording medium and are deposited on the recording medium and fixed to form an image (electrostatic attraction process). There is also an electrostatic attraction process in which ink droplets are ejected from a nozzle toward a recording medium in accordance with a print data signal without deflecting the ink droplets, whereby an image is fixed and recorded on a recording medium.

(2) a method in which ink droplets are forced to be ejected from a nozzle by applying a pressure to an ink liquid with a miniature pump and mechanically vibrating the nozzle with a quartz oscillator or the like. In this process, the ink droplets are charged when ejected from the nozzle, and while the ink droplets passed between the deflection electrodes, a print data signal is applied to the deflection electrodes, whereby the ink droplets fly toward a recording medium and form an image.

(3) a method in which a pressure and a print data signal are applied to ink at the same time with a piezo element, whereby ink droplets are ejected toward a recording medium to form an image on the recording medium (piezoelectric method).

(4) a method in which ink is heated to form bubbles therein with a micro electrode in accordance with a print data signal, and the bubbles are expanded so as to eject the ink from a nozzle toward a recording medium, whereby an image is recorded on the recording medium (BUBBLE JET (trade name) method).

The system of the inkjet head include a shuttle system and a line system.

In a shuttle system, in which a short serial head is used, recording is performed while the head scans a recording medium in a width direction thereof.

In a line system, in which a line head including recording elements positioned so as to cover the entire width of a recording medium is used, the recording medium is scanned in a direction perpendicular to the direction along which the recording elements are positioned, whereby an image is formed on the whole area of the recording medium. Therefore, a transport system such as a carriage by which a short head is scanned is not necessary. In addition, since there is no need to control the complicated movement of a carriage and the recording medium, and only the recording medium is moved, the recording can be performed at a higher speed compared with the shuttle system. The image forming process according to the present invention may be applied to either of these systems, but the effect of improving ejection accuracy and enhancing abrasion resistance of the image is even more significant when the image forming process is applied to the line system in which dummy jetting is usually not performed.

The amount of ink droplets ejected from the inkjet head is preferably from 1 pL (picoliter) to 10 pL, and more preferably from 1.5 pL to 6 pL, from the viewpoint of attaining a high-resolution image. Further, from the viewpoint of reducing unevenness in an image and smoothing the continuous-tone, it is also effective to eject ink droplets in different amounts in combination, and the present invention may be suitably applied to such a case.

Treatment Liquid Application Step

In the treatment liquid application step, a treatment liquid containing an aggregating agent that aggregates the components of the ink composition is applied onto a recording medium, and is allowed to contact the ink composition to form an image. At this time, particles such as a pigment or polymer particles dispersed in the ink composition are allowed to aggregate, whereby an image is fixed on a recording medium. The treatment liquid includes at least an aggregation agent, and details of each component thereof and exemplary embodiments thereof are described above.

The treatment liquid may be applied by a known process such as a coating process, an inkjet process, or a dipping process. The coating process may be performed in accordance with a known coating process using a bar coater, an extrusion die coater, an air doctor coater, a blade coater, a rod coater, a knife coater, a squeeze coater, a reverse roll coater, and the like. Details of the inkjet process are described above.

The treatment liquid application step may be performed either before or after the ink application step where the ink composition is used. In an exemplary embodiment of the present invention, the ink application step is performed after the treatment liquid has been applied in the treatment liquid application step. Specifically, in the exemplary embodiment, the treatment liquid, which aggregates pigment and/or self-dispersing polymer particles in the ink composition, is applied on a recording medium before applying the ink composition on the recording medium; and then the ink composition is applied in a manner that the ink composition contacts the treatment liquid that has been applied on the recording medium, whereby an image is developed. By performing inkjet recording in this way, the recording speed can be increased, and an image having high density and high resolution can be obtained even when recording is performed at high speed.

The application amount of the treatment liquid is not particularly limited as long as it is sufficient to aggregate the ink composition, but the application amount of the treatment liquid may be preferably such that the aggregating agent is applied in an amount of 0.1 g/m$^2$ or more. In particular, the application amount of the aggregating agent is preferably 0.2 g/m$^2$ to 0.7 g/m$^2$. When the application amount of the aggregating agent is 0.1 g/m$^2$ or more, favorable and rapid aggregation of the ink composition can be maintained when the ink composition is used in various manners. It is preferable that the application amount of the aggregating agent is 0.7 g/m$^2$ or less from the viewpoint of avoiding adverse effects to the surface properties of the recording medium (change in luster or the like).

In the present invention, preferably, the ink application step is performed after the treatment liquid application step. Preferably, a heat-drying step, in which the treatment liquid applied on a recording medium is dried by heating, is further performed after the application of the treatment liquid on the recording medium and before the application of the ink composition. By drying the treatment liquid by heating before the ink application step, favorable coloring properties such as suppressing bleeding can be achieved, and a visible image with favorable color density and tone can be recorded.

The heat-drying may be performed with a known heating device such as a heater, an air-blow device that uses an air-blow function of a dryer or the like, or a device in which these devices are combined. For instance, a process of applying heat with a heater or the like from a side of a recording medium opposite to a side onto which the treatment liquid is applied; a process of applying a warm or hot air to a side of a recording medium onto which the treatment liquid is applied; a heating process using an infrared heater; and the other processes are applicable. The heating may be performed by a combination of two or more of these processes.

Recording Medium

The image recording process of the present invention is a process in which an image is recorded on a recording medium. The recording medium is not particularly limited, and general purpose printing media mainly formed of cellulose, including a so-called high-quality paper that is used for conventional offset printing, a coated paper and an art paper, may be used. When an image is formed on general purpose printing media mainly formed of cellulose by inkjetting with an aqueous ink, image quality tends to be insufficient since absorption or drying of ink is relatively slow and migration of colorant after the deposition of ink droplets on such media tends to occur. However, according to the image forming process of the present invention, migration of the colorant is suppressed and a high quality image with excellent color density and tone can be recorded.

The recording medium may be selected from commercially available recording media, and examples thereof include: a high-quality paper (A) such as "OK PRINCE HIGH-QUALITY PAPER" (trade name) manufactured by Oji paper Co., Ltd., "SHIRAOI" (trade name) manufactured by Nippon Paper Industries Co., Ltd., or "NEW NPI HIGH-QUALITY" (trade name) manufactured by Nippon Paper Industries Co., Ltd.; a lightly coated paper such as "OK EVERLIGHT COAT" (trade name) manufactured by Oji paper Co., Ltd. or "AURORA S" (trade name) manufactured by Nippon Paper Industries Co., Ltd.; a lightweight coated paper (A3) such as "OK COAT L" (trade name) manufactured by Oji paper Co., Ltd. or "AURORA L" (trade name) manufactured by Nippon Paper Industries Co., Ltd.; a coated paper (A2, B2) such as "OK TOPCOAT PLUS" (trade name) manufactured by Oji paper Co., Ltd. or "AURORA COAT" (trade name) manufactured by Nippon Paper Industries Co., Ltd.; and an art paper (A1) such as "OK KINFUJI PLUS" (trade name) manufactured by Oji paper Co., Ltd. or "TOKUBISHI ART" (trade name) manufacture by Mitsubishi Paper Mills Ltd. Furthermore, various kinds of photographic papers for inkjet recording may be used.

Among these recording media, coated paper that is used for general offset printing is preferable. The coated paper has a coating layer formed by applying a coating material onto a surface of high-quality paper or neutralized paper that contains cellulose as a main ingredient and generally has no surface treatment. In a conventional image forming process using a water-based ink, the coated paper may easily cause quality problems on luster or abrasion resistance of images. However, in the image forming process of the present invention, luster unevenness is suppressed, whereby an image having appropriate luster and abrasion resistance may be obtained. In particular, coated paper having a coating layer that contains an inorganic pigment on a base paper is preferably used, and coated paper having a coating layer that contains kaolin and/or calcium bicarbonate on a base paper is more preferred. Specifically, art paper, coated paper, light-weight paper or lightly coated paper is further preferable.

Inkjet Recording Apparatus

Next, an exemplary embodiment of an inkjet recording apparatus suitably used for the image forming process of the present invention with be described in detail with reference to FIG. 1. FIG. 1 is a schematic diagram showing an exemplary configuration of the entire body of the inkjet recording apparatus.

As shown in FIG. 1, the inkjet recording apparatus includes a treatment liquid application unit 12 that is equipped with a treatment liquid ejection head 12S through which a treatment liquid is ejected; a treatment liquid drying zone 13 that is equipped with a heating device (not shown in the FIGURE) that dries the treatment liquid applied; an ink ejection unit 14 from which an ink composition is ejected; and an ink drying zone 15 in which the ink composition ejected is dried, in this order in a direction of transporting a recording medium. Further, a UV light irradiation unit 16 that is equipped with a UV light irradiation lamp 16S is disposed downstream of the ink drying zone 15 in the direction of transporting the recording medium, A recording medium supplied to the inkjet recording apparatus from a paper supplying unit, which takes out the recording medium from a case in which recording media are placed, is transported with conveyer rollers in a direction of from the treatment liquid application unit 12, the treatment liquid drying zone 13, the ink ejection unit 14, the ink drying zone 15, and the UV light irradiation unit 16, and then stored in a storage unit. The transportation of the recording medium may also be performed via a drum conveying system in which a drum-shaped member is used, a belt conveying system in which a belt-shaped member is used, a stage conveying system in which a stage is used, or the like.

At least one of the conveyer rollers may be driven by a motor (not shown in the FIGURE) that transmits power to the roller. By rotating the roller driven by a motor at a constant rate, the recording medium can be transported at a desired rate in a desired direction.

The treatment liquid application unit 12 is equipped with the treatment liquid ejection head 12S that is connected with a storage tank where the treatment liquid is stored. In the treatment liquid ejection head 12S, the treatment liquid is ejected through an ejection nozzle that is disposed at a position facing the recording side of a recording medium, and droplets of the treatment liquid are applied onto the recording medium. The treatment liquid application unit 12 may employ not only a system in which ejection is performed through a nozzle head but also a coating system in which a coating roll is used. In the coating system, the treatment liquid can be easily applied on almost the entire surface of the recording medium including image areas on which ink droplets are deposited, with an ink ejection unit 14 that is disposed on the downstream side. In order to maintain a uniform thickness of the treatment liquid applied on the recording medium, for example, an air knife may be used or a member having an acute angle is positioned on a recording medium with a gap corresponding to an intended application amount of the treatment liquid.

The treatment liquid drying zone 13 is disposed downstream of the treatment liquid application unit 12 in a direction of transporting the recording medium. The treatment liquid drying zone 13 may include a known heating device such as a heater, an air-blower such as a dryer, or a combination of these devices. The heating device may employ an appropriate system such as a system in which a heating member such as a heater is disposed on a side of a recording medium opposite to a side on which the treatment liquid is applied (for instance, when the recording medium is automatically transported, under a transport system that carries the recording medium thereon), a system in which a warm or hot air is applied to the treatment liquid-applied side of the recording medium, or a heating system in which an infrared heater is used. The heating may be performed by a combination of these systems.

Since the surface temperature of the recording medium may change depending on the type of the recording medium (material, thickness or the like), the ambient temperature, or the like, the treatment liquid is preferably applied while controlling the surface temperature of the recording medium by using a measurement unit that measures the surface temperature of the recording medium and a control unit that feeds back the value of the surface temperature of the recording medium to a unit that controls the heating. The measurement unit that measures the surface temperature of the recording medium is preferably a contact or non-contact type thermometer.

In addition, the solvent may be removed by using a solvent removing roller or the like. In another embodiment, an air knife may be used for removing excess solvent from the recording medium.

The ink ejection unit 14 is disposed downstream of the treatment liquid drying zone 13 in the direction of transporting the recording medium. The ink ejection unit 14 includes recording heads (ink ejection heads) of 30K 30C, 30M and 30Y. Respective recording heads connect with respective ink storage units each containing inks of black (K), cyan (C), magenta (M) and yellow (Y), respectively. The ink storage units, which are not shown in the FIGURE, include ink compositions containing a pigment of the corresponding color, resin particles, a water-soluble organic solvent, and water. The ink compositions are supplied to respective ink ejection heads of 30K, 30C, 30M and 30Y during recording an image, as necessary. In addition, as shown in FIG. 1, recording heads 30A and 30B that eject inks of a spot color may be further provided downstream of the ink ejection heads 30K, 30C, 30M and 30Y.

Ink ejection heads 30K, 30C, 30M and 30Y eject inks from ejection nozzles facing the recording side of the recording medium, whereby inks of respective colors are applied onto the recording side of the recording medium to form a color image.

The treatment liquid ejection heads 12S and the ink ejection heads of 30K, 30C, 30M and 30Y are arranged in a full line head provided with a large number of nozzles along with a maximum recording width of an image recorded on the recording medium. An image is allowed to be recorded on the recording medium at higher speed as compared with a serial type head recording system, in which recording is performed by scanning the image with a short shuttle head in a reciprocating manner in a width direction (a direction perpendicular to a direction in which the recording medium is transported) of the recording medium. In the present invention, the recording may be performed by either a serial-type recording system or a single-pass recording system that enables relatively high-speed recording by forming one line at a single scan. According to the image recording process of the present invention, a high-quality image with high reproducibility may be obtained even by a single-pass recording system.

In the inkjet recording apparatus mentioned herein, all of the treatment liquid ejection heads 12S and the ink ejection heads of 30K, 30C, 30M, 30Y, 30A, and 30B have a substantially similar structure.

It is desirable to control the application amount of the treatment liquid and the application amount of the ink composition, as necessary. For instance, in accordance with the recording medium, the application amount of the treatment liquid may be changed for the purpose of controlling the properties of an aggregation formed by mixing the treatment liquid and the ink composition, such as visco-elasticity.

The ink drying zone 15 is disposed downstream of the ink ejection unit 14 in the direction of transporting the recording medium. The ink drying zone 15 may have a similar structure to that of the treatment liquid drying zone 13.

The UV light irradiation unit 16 is disposed downstream of the ink drying zone 15 in the direction of transporting the recording medium. The image is irradiated with UV light emitted from a UV light irradiation lamp 16S that is installed in the UV light irradiation unit 16, thereby polymerizing and curing the monomer component in the image that has been dried. The UV light irradiation lamp 16S is configured so as to irradiate the entire recording surface of the recording medium with the lamp that is disposed at a position facing the recording face, thereby curing the entire image. The UV light irradiation unit 16 may also employ a halogen lamp, a high-pressure mercury lamp, an LED, an electron beam irradiation device, or the like.

The UV light irradiation unit 16 may be disposed in front of the ink drying zone 15 or behind the same, or may be disposed at both positions.

In addition, the inkjet recording apparatus may include a heating means on the transporting path ranging from the paper supplying unit to the storage unit. For instance, a heating means may be provided upstream of the treatment liquid drying zone 13, or in between the ink ejection unit 14 and the ink drying zone 15, in order to elevate the temperature of the recording medium to effectively perform drying and fixing.

Examples

The present invention will be further described in detail with reference to the following examples, but it should be construed that the invention is in no way limited to those examples. Unless otherwise particularly mentioned, "part(s)" and "%" are based on mass.

Synthesis of Polymer Dispersant P-1

In a 1000 mL three-necked flask equipped with an agitator and a condenser tube, 88 g of methylethyl ketone were added and heated at 72° C. in an nitrogen gas atmosphere; and a solution prepared by dissolving 0.85 g of dimethyl-2,2'-azobisisobutyrate, 60 g of benzyl methacrylate, 10 g of methacrylic acid, and 30 g of methyl methacrylate in 50 g of methylethyl ketone was further added by dropping over 3 hours. After the completion of the dropping, the resulting reaction mixture was further allowed to react for 1 hour. Then, a solution prepared by dissolving 0.42 g of 2,2'-azobisisobutylate in 2 g of methylethyl ketone was added. Thereafter, the temperature of the reaction mixture was elevated to 78° C. and the reaction mixture was heated for 4 hours. The resulting reaction solution was re-precipitated twice in a large excess amount of hexane. The resulting precipitated resin was dried, and 96 g of a polymer dispersant P-1 having the following structure was obtained.

The composition of the resulting resin was confirmed by $^1$H-NMR. The weight average molecular weight (Mw) measured by GPC was 44,600. The acid value measured in accordance with the JIS standard (JISK0070:1992) was 65.2 mgKOH/g.

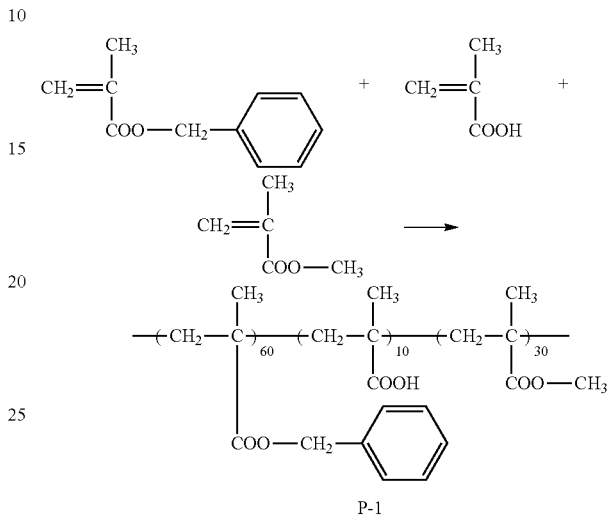

Preparation of Resin-Coated Pigment Dispersion

Resin-Coated Cyan Pigment Dispersion (C)

Pigment Blue 15:3 ("PHTHALOCYANINE BLUE A220", trade name, manufactured by Dainichiseika Color & Chemicals Mfg. Co., Ltd.) in an amount of 10 parts, the above polymer dispersant P-1 in an amount of 5 parts, methylethyl ketone in an amount of 42 parts, 1 mol/L NaOH aqueous solution in an amount of 5.5 parts, and ion exchanged water in an amount of 87.2 parts were mixed, and then dispersed in a bead mill with zirconia beads having a diameter of 0.1 mm for 2 to 6 hours.

Methylethyl ketone was removed at 55° C. under reduced pressure from the resulting dispersion, and part of water was further removed, thereby obtaining a dispersion (color particles) (C) of resin-coated cyan pigment having a pigment concentration of 10.2% by mass.

Resin-Coated Magenta Pigment Dispersion (M)

Resin-coated magenta pigment dispersion (color particles) (M) was obtained in a substantially similar manner to the above process, except that "CHROMOPHTHAL JET MAGENTA DMQ" (trade name, Pigment Red 122, manufactured by BASF Japan Ltd.) was used in place of "PHTHALOCYANINE BLUE A220" that was used as a pigment in the preparation of the above resin-coated cyan pigment dispersion.

Resin-Coated Yellow Pigment Dispersion (Y)

Resin-coated yellow pigment dispersion (color particles) (Y) was obtained in a substantially similar manner to the above process, except that "IRGALITE YELLOW GS" (trade name, Pigment Yellow 74, manufactured by BASF Japan Ltd.) was used in place of "PHTHALOCYANINE BLUE A220" that was used as a pigment in the preparation of the above resin-coated cyan pigment dispersion.

Resin-Coated Black Pigment Dispersion (K)

Resin-coated black pigment dispersion (color particles) (K) was obtained in a substantially similar manner to the above process, except that "CAB-O-JET 200" (trade name, carbon black, manufactured by Cabot Corp.) was used in place of "PHTHALOCYANINE BLUE A220" that was used as a pigment in the preparation of the above resin-coated cyan pigment dispersion.

Preparation of Ink Composition 1

As described below, a cyan ink (C-1), a magenta ink (M-1), a yellow ink (Y-1), and a black ink (K-1) were prepared, respectively, thereby obtaining ink compositions 1 composed of these inks.

Preparation of Cyan Ink C-1

The resin-coated cyan pigment dispersion (C), a water-soluble organic solvent, ion-exchanged water, a polymerization initiator, a polymerizable compound, and a surfactant as described below were mixed, and the resulting mixture was filtrated with a 5 μm membrane filter to obtain a cyan ink C-1.

Composition of Cyan Ink C-1

Resin-coated cyan pigment dispersion (C): 6% (solid content concentration)

IRGACURE 2959 (trade name: polymerization initiator, manufactured by BASF Japan Ltd.): 3%

Polymerizable compound 1 (a polymerizable compound having an acrylamide structure): 20%

OLFINE E1010 (trade name: surfactant, manufactured by Nisshin Chemical Co., Ltd.): 1%

Urea (solid wetting agent, manufactured by Nissan Chemical Industries, Ltd.): 3%

Ion-exchanged water: balance (added so as to attain 100% by mass of total amount)

The pH of the cyan pigment ink C-1 was measured with a pH meter (WM-50EG, trade, manufactured by DKK-TOA Corp.), and the pH was 8.5.

Preparation of Magenta Ink (M-1)

A magenta ink (M-1) was prepared in similar manner to the above process, except that the resin-coated magenta pigment dispersion (M) was used in place of the resin-coated cyan pigment dispersion (C). The pH was 8.5.

Preparation of Yellow Ink (Y-1)

A yellow ink (Y-1) was prepared in a similar manner to the above, except that the resin-coated yellow pigment dispersion (Y) was used in place of the resin-coated cyan pigment dispersion (C). The pH was 8.5.

Preparation of Black Ink (K-1)

A black ink (K-1) was prepared in a similar manner to the above, except that the resin-coated black pigment dispersion (K) was used in place of the resin-coated cyan pigment dispersion (C). The pH was 8.5.

Ink compositions 2 to 13 shown in Tables 1 and 2 were prepared in accordance with the preparation of ink compositions 1 (unit: % by mass).

TABLE 1

| Ink 1 | Cyan ink (C-1) | | Magenta ink (M-1) | |
|---|---|---|---|---|
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | Polymerizable compound 1 | 20 | Polymerizable compound 1 | 20 |
| Surfactant | OLFINE E1010 | 1 | OLFINE E1010 | 1 |
| Wetting agent | Urea | 3 | Urea | 3 |
| Water | Ion exchanged water | balance | Ion exchanged water | balance |
| B/A ratio | | 15 | | 15 |
| Ink 2 | Cyan ink (C-2) | | Magenta ink (M-2) | |
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | Polymerizable compound 1 | 20 | Polymerizable compound 1 | 20 |
| Surfactant | OLFINE E1010 | 1 | OLFINE E1010 | 1 |
| Wetting agent | Glucose | 3 | Glucose | 3 |
| Water | Ion exchanged water | balance | Ion exchanged water | balance |
| B/A ratio | | 15 | | 15 |
| Ink 3 | Cyan ink (C-3) | | Magenta ink (M-3) | |
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | Polymerizable compound 1 | 20 | Polymerizable compound 1 | 20 |
| Surfactant | OLFINE E1010 | 1 | OLFINE E1010 | 1 |
| Wetting agent | Maltitol | 3 | Maltitol | 3 |
| Water | Ion exchanged water | balance | Ion exchanged water | balance |
| B/A ratio | | 15 | | 15 |
| Ink 4 | Cyan ink (C-4) | | Magenta ink (M-4) | |
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | Polymerizable compound 1 | 20 | Polymerizable compound 1 | 20 |

TABLE 1-continued

| | | | | |
|---|---|---|---|---|
| Surfactant | OLFINE E1010 | 1 | OLFINE E1010 | 1 |
| Wetting agent | Sorbitol | 3 | Sorbitol | 3 |
| Water | Ion exchanged water | balance | Ion exchanged water | balance |
| B/A ratio | | 15 | | 15 |

| Ink 5 | Cyan ink (C-5) | | Magenta ink (M-5) | |
|---|---|---|---|---|
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | Polymerizable compound 1 | 20 | Polymerizable compound 1 | 20 |
| Surfactant | OLFINE E1010 | 1 | OLFINE E1010 | 1 |
| Wetting agent | Betaine anhydrous | 3 | Betaine anhydrous | 3 |
| Water | Ion exchanged water | balance | Ion exchanged water | balance |
| B/A ratio | | 15 | | 15 |

| Ink 6 | Cyan ink (C-6) | | Magenta ink (M-6) | |
|---|---|---|---|---|
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | Polymerizable compound 1 | 20 | Polymerizable compound 1 | 20 |
| Surfactant | OLFINE E1010 | 1 | OLFINE E1010 | 1 |
| Wetting agent | 2.2-dimethyl-1,3-propanediol | 3 | 2.2-dimethyl-1,3-propanediol | 3 |
| Water | Ion exchanged water | balance | Ion exchanged water | balance |
| B/A ratio | | 15 | | 15 |

| Ink 7 | Cyan ink (C-7) | | Magenta ink (M-7) | |
|---|---|---|---|---|
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | Polymerizable compound 1 | 20 | Polymerizable compound 1 | 20 |
| Surfactant | OLFINE E1010 | 1 | OLFINE E1010 | 1 |
| Wetting agent | trimethylol propane | 3 | trimethylol propane | 3 |
| Water | Ion exchanged water | balance | Ion exchanged water | balance |
| B/A ratio | | 15 | | 15 |

| Ink 8 | Cyan ink (C-8) | | Magenta ink (M-8) | |
|---|---|---|---|---|
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | Polymerizable compound 1 | 20 | Polymerizable compound 1 | 20 |
| Surfactant | OLFINE E1010 | 1 | OLFINE E1010 | 1 |
| Wetting agent | 1,6-hexanediol | 3 | 1,6-hexanediol | 3 |
| Water | Ion exchanged water | balance | Ion exchanged water | balance |
| B/A ratio | | 15 | | 15 |

| Ink 9 | Cyan ink (C-9) | | Magenta ink (M-9) | |
|---|---|---|---|---|
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | Polymerizable compound 1 | 20 | Polymerizable compound 1 | 20 |
| Surfactant | OLFINE E1010 | 1 | OLFINE E1010 | 1 |
| Wetting agent | 1,2,6-hexanetriol | 3 | 1,2,6-hexanetriol | 3 |
| Water | Ion exchanged water | balance | Ion exchanged water | balance |
| B/A ratio | | 15 | | 15 |

| Ink 1 | Yellow ink (Y-1) | | Black ink (K-1) | |
|---|---|---|---|---|
| Resin-coated pigment dispersion | Resin-coated yellow pigment dispersion | 6 | Resin-coated black pigment dispersion | 6 |
| Polymerization initiator | IRGACURE 2959 | 3 | IRGACURE 2959 | 3 |
| Polymerizable compound | Polymerizable compound 1 | 20 | Polymerizable compound 1 | 20 |
| Surfactant | OLFINE E1010 | 1 | OLFINE E1010 | 1 |
| Wetting agent | Urea | 3 | Urea | 3 |

TABLE 1-continued

| | Water | Ion exchanged water | balance | Ion exchanged water | balance |
|---|---|---|---|---|---|
| | B/A ratio | | 15 | | 15 |

| Ink 2 | | Yellow ink (Y-2) | | Black ink (K-2) | |
|---|---|---|---|---|---|
| Resin-coated pigment dispersion | Resin-coated yellow pigment dispersion | | 6 | Resin-coated black pigment dispersion | 6 |
| Polymerization initiator | IRGACURE 2959 | | 3 | IRGACURE 2959 | 3 |
| Polymerizable compound | Polymerizable compound 1 | | 20 | Polymerizable compound 1 | 20 |
| Surfactant | OLFINE E1010 | | 1 | OLFINE E1010 | 1 |
| Wetting agent | Glucose | | 3 | Glucose | 3 |
| Water | Ion exchanged water | | balance | Ion exchanged water | balance |
| B/A ratio | | | 15 | | 15 |

| Ink 3 | | Yellow ink (Y-3) | | Black ink (K-3) | |
|---|---|---|---|---|---|
| Resin-coated pigment dispersion | Resin-coated yellow pigment dispersion | | 6 | Resin-coated black pigment dispersion | 6 |
| Polymerization initiator | IRGACURE 2959 | | 3 | IRGACURE 2959 | 3 |
| Polymerizable compound | Polymerizable compound 1 | | 20 | Polymerizable compound 1 | 20 |
| Surfactant | OLFINE E1010 | | 1 | OLFINE E1010 | 1 |
| Wetting agent | Maltitol | | 3 | Maltitol | 3 |
| Water | Ion exchanged water | | balance | Ion exchanged water | balance |
| B/A ratio | | | 15 | | 15 |

| Ink 4 | | Yellow ink (Y-4) | | Black ink (K-4) | |
|---|---|---|---|---|---|
| Resin-coated pigment dispersion | Resin-coated yellow pigment dispersion | | 6 | Resin-coated black pigment dispersion | 6 |
| Polymerization initiator | IRGACURE 2959 | | 3 | IRGACURE 2959 | 3 |
| Polymerizable compound | Polymerizable compound 1 | | 20 | Polymerizable compound 1 | 20 |
| Surfactant | OLFINE E1010 | | 1 | OLFINE E1010 | 1 |
| Wetting agent | Sorbitol | | 3 | Sorbitol | 3 |
| Water | Ion exchanged water | | balance | Ion exchanged water | balance |
| B/A ratio | | | 15 | | 15 |

| Ink 5 | | Yellow ink (Y-5) | | Black ink (K-5) | |
|---|---|---|---|---|---|
| Resin-coated pigment dispersion | Resin-coated yellow pigment dispersion | | 6 | Resin-coated black pigment dispersion | 6 |
| Polymerization initiator | IRGACURE 2959 | | 3 | IRGACURE 2959 | 3 |
| Polymerizable compound | Polymerizable compound 1 | | 20 | Polymerizable compound 1 | 20 |
| Surfactant | OLFINE E1010 | | 1 | OLFINE E1010 | 1 |
| Wetting agent | Betaine anhydrous | | 3 | Betaine anhydrous | 3 |
| Water | Ion exchanged water | | balance | Ion exchanged water | balance |
| B/A ratio | | | 15 | | 15 |

| Ink 6 | | Yellow ink (Y-6) | | Black ink (K-6) | |
|---|---|---|---|---|---|
| Resin-coated pigment dispersion | Resin-coated yellow pigment dispersion | | 6 | Resin-coated black pigment dispersion | 6 |
| Polymerization initiator | IRGACURE 2959 | | 3 | IRGACURE 2959 | 3 |
| Polymerizable compound | Polymerizable compound 1 | | 20 | Polymerizable compound 1 | 20 |
| Surfactant | OLFINE E1010 | | 1 | OLFINE E1010 | 1 |
| Wetting agent | 2,2-dimethyl-1,3-propanediol | | 3 | 2,2-dimethyl-1,3-propanediol | 3 |
| Water | Ion exchanged water | | balance | Ion exchanged water | balance |
| B/A ratio | | | 15 | | 15 |

| Ink 7 | | Yellow ink (Y-7) | | Black ink (K-7) | |
|---|---|---|---|---|---|
| Resin-coated pigment dispersion | Resin-coated yellow pigment dispersion | | 6 | Resin-coated black pigment dispersion | 6 |
| Polymerization initiator | IRGACURE 2959 | | 3 | IRGACURE 2959 | 3 |
| Polymerizable compound | Polymerizable compound 1 | | 20 | Polymerizable compound 1 | 20 |
| Surfactant | OLFINE E1010 | | 1 | OLFINE E1010 | 1 |
| Wetting agent | trimethylol propane | | 3 | trimethylol propane | 3 |

TABLE 1-continued

| | | | | |
|---|---|---|---|---|
| Water | Ion exchanged water | balance | Ion exchanged water | balance |
| B/A ratio | | 15 | | 15 |
| Ink 8 | Yellow ink (Y-8) | | Black ink (K-8) | |
| Resin-coated pigment dispersion | Resin-coated yellow pigment dispersion | 6 | Resin-coated black pigment dispersion | 6 |
| Polymerization initiator | IRGACURE 2959 | 3 | IRGACURE 2959 | 3 |
| Polymerizable compound | Polymerizable compound 1 | 20 | Polymerizable compound 1 | 20 |
| Surfactant | OLFINE E1010 | 1 | OLFINE E1010 | 1 |
| Wetting agent | 1,6-hexanediol | 3 | 1,6-hexanediol | 3 |
| Water | Ion exchanged water | balance | Ion exchanged water | balance |
| B/A ratio | | 15 | | 15 |
| Ink 9 | Yellow ink (Y-9) | | Black ink (K-9) | |
| Resin-coated pigment dispersion | Resin-coated yellow pigment dispersion | 6 | Resin-coated black pigment dispersion | 6 |
| Polymerization initiator | IRGACURE 2959 | 3 | IRGACURE 2959 | 3 |
| Polymerizable compound | Polymerizable compound 1 | 20 | Polymerizable compound 1 | 20 |
| Surfactant | OLFINE E1010 | 1 | OLFINE E1010 | 1 |
| Wetting agent | 1,2,6-hexanetriol | 3 | 1,2,6-hexanetriol | 3 |
| Water | Ion exchanged water | balance | Ion exchanged water | balance |
| B/A ratio | | 15 | | 15 |

TABLE 2

| | | | | |
|---|---|---|---|---|
| Ink 10 | Cyan ink (C-10) | | Magenta ink (M-10) | |
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | Polymerizable compound 1 | 20 | Polymerizable compound 1 | 20 |
| Surfactant | OLFINE E1010 | 1 | OLFINE E1010 | 1 |
| Wetting agent | N-propyl urea | 3 | N-propyl urea | 3 |
| Water | Ion exchanged water | balance | Ion exchanged water | balance |
| B/A ratio | | 15 | | 15 |
| Ink 11 | Cyan ink (C-11) | | Magenta ink (M-11) | |
| Resin-coated pigment dispersion | Resin-coated cyan pigment dispersion | 6 | Resin-coated magenta pigment dispersion | 6 |
| Polymerization initiator | IRGACURE 2959 | 1.5 | IRGACURE 2959 | 1.5 |
| Polymerizable compound | Polymerizable compound 3 | 10 | Polymerizable compound 3 | 10 |
| Surfactant | OLFINE E1010 | 1 | OLFINE E1010 | 1 |
| Wetting agent | Urea | 10 | Urea | 10 |
| Water | Ion exchanged water | balance | Ion exchanged water | balance |
| B/A ratio | | 100 | | 100 |
| Ink 12 | Cyan ink (C-12) | | Magenta ink (M-12) | |
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | Polymerizable compound 2 | 20 | Polymerizable compound 2 | 20 |
| Surfactant | OLFINE E1010 | 1 | OLFINE E1010 | 1 |
| Wetting agent | Urea | 3 | Urea | 3 |
| Water | Ion exchanged water | balance | Ion exchanged water | balance |
| B/A ratio | | 15 | | 15 |
| Ink 13 | Cyan ink (C-13) | | Magenta ink (M-13) | |
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |

TABLE 2-continued

| | | | | |
|---|---|---|---|---|
| Polymerizable compound | Polymerizable compound 4 | 20 | Polymerizable compound 4 | 20 |
| Surfactant | OLFINE E1010 | 1 | OLFINE E1010 | 1 |
| Wetting agent | Urea | 3 | Urea | 3 |
| Water | Ion exchanged water | balance | Ion exchanged water | balance |
| B/A ratio | | 15 | | 15 |
| Ink 14 (comparative) | Cyan ink (C-14) | | Magenta ink (M-14) | |
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | NK ESTER A-400 | 20 | NK ESTER A-400 | 20 |
| Surfactant | OLFINE E1010 | 1 | OLFINE E1010 | 1 |
| Wetting agent | Sugar (II) (liquid) | 3 | Sugar (II) (liquid) | 3 |
| Water | Ion exchanged water | balance | Ion exchanged water | balance |
| B/A ratio | | 15 | | 15 |
| Ink 15 (comparative) | Cyan ink (C-15) | | Magenta ink (M-15) | |
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | Polymerizable compound 3 | 20 | Polymerizable compound 3 | 20 |
| Surfactant | OLFINE E1010 | 1 | OLFINE E1010 | 1 |
| Wetting agent | none | 0 | none | 0 |
| Water | Ion exchanged water | balance | Ion exchanged water | balance |
| B/A ratio | | 0 | | 0 |
| Ink 16 (comparative) | Cyan ink (C-16) | | Magenta ink (M-16) | |
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | Polymerizable compound 3 | 20 | Polymerizable compound 3 | 20 |
| Surfactant | OLFINE E1010 | 1 | OLFINE E1010 | 1 |
| Wetting aeent | Glycerin (liquid) | 3 | Glycerin (liquid) | 3 |
| Water | Ion exchanged water | balance | Ion exchanged water | balance |
| B/A ratio | | 15 | | 15 |
| Ink 17 (comparative) | Cyan ink (C-17) | | Magenta ink (M-17) | |
| Resin-coated pigment dispersion | Resin-coated cyan pigment dispersion | 6 | Resin-coated magenta pigment dispersion | 6 |
| Polymerization initiator | IRGACURE 2959 | 3 | IRGACURE 2959 | 3 |
| Polymerizable compound | Polymerizable compound 3 | 10 | Polymerizable compound 3 | 10 |
| Surfactant | OLFINE E1010 | 1 | OLFINE E1010 | 1 |
| Wetting agent | Glucose | 45 | Glucose | 45 |
| Water | Ion exchanged water | balance | Ion exchanged water | balance |
| B/A ratio | | 450 | | 450 |
| Ink 10 | Yellow ink (Y-10) | | Black ink (K-10) | |
| Resin-coated pigment dispersion | Resin-coated yellow pigment dispersion | 6 | Resin-coated black pigment dispersion | 6 |
| Polymerization initiator | IRGACURE 2959 | 3 | IRGACURE 2959 | 3 |
| Polymerizable compound | Polymerizable compound 1 | 20 | Polymerizable compound 1 | 20 |
| Surfactant | OLFINE E1010 | 1 | OLFINE E1010 | 1 |
| Wetting agent | N-propyl urea | 3 | N-propyl urea | 3 |
| Water | Ion exchanged water | balance | Ion exchanged water | balance |
| B/A ratio | | 15 | | 15 |
| Ink 11 | Yellow ink (Y-11) | | Black ink (K-11) | |
| Resin-coated pigment dispersion | Resin-coated yellow pigment dispersion | 6 | Resin-coated black pigment dispersion | 6 |
| Polymerization initiator | IRGACURE 2959 | 1.5 | IRGACURE 2959 | 1.5 |
| Polymerizable compound | Polymerizable compound 3 | 10 | Polymerizable compound 3 | 10 |

TABLE 2-continued

| | | | | |
|---|---|---|---|---|
| Surfactant | OLFINE E1010 | 1 | OLFINE E1010 | 1 |
| Wetting agent | Urea | 10 | Urea | 10 |
| Water | Ion exchanged water | balance | Ion exchanged water | balance |
| B/A ratio | | 100 | | 100 |

| Ink 12 | Yellow ink (Y-12) | | Black ink (K-12) | |
|---|---|---|---|---|
| Resin-coated pigment dispersion | Resin-coated yellow pigment dispersion | 6 | Resin-coated black pigment dispersion | 6 |
| Polymerization initiator | IRGACURE 2959 | 3 | IRGACURE 2959 | 3 |
| Polymerizable compound | Polymerizable compound 2 | 20 | Polymerizable compound 2 | 20 |
| Surfactant | OLFINE E1010 | 1 | OLFINE E1010 | 1 |
| Wetting agent | Urea | 3 | Urea | 3 |
| Water | Ion exchanged water | balance | Ion exchanged water | balance |
| B/A ratio | | 15 | | 15 |

| Ink 13 | Yellow ink (Y-13) | | Black ink (K-13) | |
|---|---|---|---|---|
| Resin-coated pigment dispersion | Resin-coated yellow pigment dispersion | 6 | Resin-coated black pigment dispersion | 6 |
| Polymerization initiator | IRGACURE 2959 | 3 | IRGACURE 2959 | 3 |
| Polymerizable compound | Polymerizable compound 4 | 20 | Polymerizable compound 4 | 20 |
| Surfactant | OLFINE E1010 | 1 | OLFINE E1010 | 1 |
| Wetting agent | Urea | 3 | Urea | 3 |
| Water | Ion exchanged water | balance | Ion exchanged water | balance |
| B/A ratio | | 15 | | 15 |

| Ink 14 (comparative) | Yellow ink (Y-14) | | Black ink (K-14) | |
|---|---|---|---|---|
| Resin-coated pigment dispersion | Resin-coated yellow pigment dispersion | 6 | Resin-coated black pigment dispersion | 6 |
| Polymerization initiator | IRGACURE 2959 | 3 | IRGACURE 2959 | 3 |
| Polymerizable compound | NK ESTER A-400 | 20 | NK ESTER A-400 | 20 |
| Surfactant | OLFINE E1010 | 1 | OLFINE E1010 | 1 |
| Wetting agent | Sugar (II) (liquid) | 3 | Sugar (II) (liquid) | 3 |
| Water | Ion exchanged water | balance | Ion exchanged water | balance |
| B/A ratio | | 15 | | 15 |

| Ink 15 (comparative) | Yellow ink (Y-15) | | Black ink (K-15) | |
|---|---|---|---|---|
| Resin-coated pigment dispersion | Resin-coated yellow pigment dispersion | 6 | Resin-coated black pigment dispersion | 6 |
| Polymerization initiator | IRGACURE 2959 | 3 | IRGACURE 2959 | 3 |
| Polymerizable compound | Polymerizable compound 3 | 20 | Polymerizable compound 3 | 20 |
| Surfactant | OLFINE E1010 | 1 | OLFINE E1010 | 1 |
| Wetting agent | none | 0 | none | 0 |
| Water | Ion exchanged water | balance | Ion exchanged water | balance |
| B/A ratio | | 0 | | 0 |

| Ink 16 (comparative) | Yellow ink (Y-16) | | Black ink (K-16) | |
|---|---|---|---|---|
| Resin-coated pigment dispersion | Resin-coated yellow pigment dispersion | 6 | Resin-coated black pigment dispersion | 6 |
| Polymerization initiator | IRGACURE 2959 | 3 | IRGACURE 2959 | 3 |
| Polymerizable compound | Polymerizable compound 3 | 20 | Polymerizable compound 3 | 20 |
| Surfactant | OLFINE E1010 | 1 | OLFINE E1010 | 1 |
| Wetting aeent | Glycerin (liquid) | 3 | Glycerin (liquid) | 3 |
| Water | Ion exchanged water | balance | Ion exchanged water | balance |
| B/A ratio | | 15 | | 15 |

| Ink 17 (comparative) | Yellow ink (Y-17) | | Black ink (K-17) | |
|---|---|---|---|---|
| Resin-coated pigment dispersion | Resin-coated yellow pigment dispersion | 6 | Resin-coated black pigment dispersion | 6 |
| Polymerization initiator | IRGACURE 2959 | 3 | IRGACURE 2959 | 3 |
| Polymerizable compound | Polymerizable compound 3 | 10 | Polymerizable compound 3 | 10 |
| Surfactant | OLFINE E1010 | 1 | OLFINE E1010 | 1 |
| Wetting agent | Glucose | 45 | Glucose | 45 |

TABLE 2-continued

| Water | Ion exchanged water | balance | Ion exchanged water | balance |
| B/A ratio | | 450 | | 450 |

NK ESTER A-400 (trade name) is manufactured by Shin-Nakamura Chemical Co., Ltd.

The structures and the synthesis methods of the polymerizable compounds 1, 2, 3 and 4 and sugar (II) that were used for the ink compositions shown in Tables 1 and 2 are described elow.

Polymerizable Compound 1

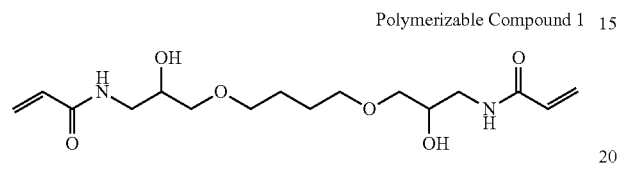

Synthesis of Polymerizable Compound 1

In a 1 L three-necked flask equipped with an agitator, 40.0 g (563 mmol) of acrylamide, 57.0 g (282 mmol) of butanediol diglycidylether, 15.6 g (113 mmol) of potassium carbonate, 25.7 g (113 mmol) of benzyl triethyl ammonium chloride, and 500 mL of dioxane were charged. The resulting reaction mixture was heated and agitated at 90° C. for 10 hours. After that, the reaction mixture was subjected to filtration; dioxane was distilled out under vacuum; and 200 mL of saturated salt water were added. Then, the reaction mixture was extracted with 300 mL of butanol three times, and the resulting organic layer was dried with magnesium sulfate. After the filtration and the solvent removal by vacuum distillation, 58.2 g (169 mmol, yield: 60%) of a polymerizable compound 1 were obtained.

Polymerizable compound 2

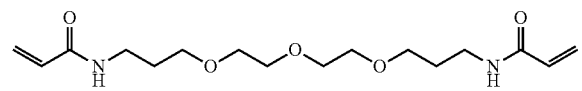

Synthesis of Polymerizable Compound 2

In a 1 L three-necked flask equipped with an agitator, 40.0 g (182 mmol) of 4,7,10-trioxa-1,13-tridecane diamine, 37.8 g (450 mmol) of sodium hydrogen carbonate, 100 g of water, and 300 mL of tetrahydrofuran were charged. Then, 35.2 g (389 mmol) of acrylic acid chloride were added by dropping over 20 minutes in an ice bath. After the completion of the dropping, the resulting reaction mixture was agitated at room temperature for 5 hours. Then, tetrahydrofuran was removed from the reaction mixture by vacuum distillation. After that, the resulting aqueous layer was extracted with 200 mL of ethylacetate four times, and the resulting organic layer was dried with magnesium sulfate. After the filtration and the solvent removal by vacuum distillation, 35.0 g (107 mmol, yield: 59%) of a polymerizable compound 2 in the form of a white solid were obtained.

Polymerizable compound 3

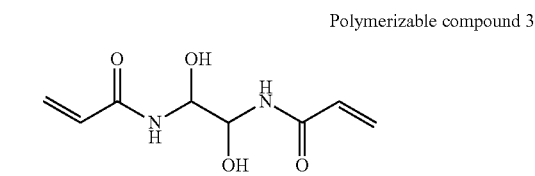

(manufactured by Tokyo Chemical Industry Co., Ltd.)

Polymerizable compound 4

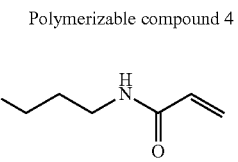

The polymerizable compound 4 can be synthesized in accordance with a method of synthesizing the polymerizable compound 1 or the polymerizable compound 2.

Sugar (II)

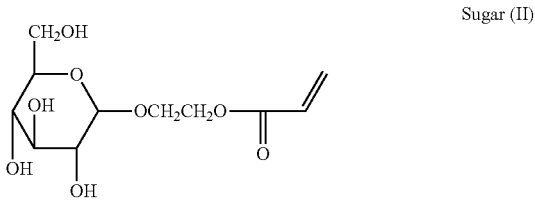

The sugar (II) can be synthesized by a known process.

Preparation of Treatment Liquid 1

The following materials were mixed to prepare a treatment liquid 1. The pH (25° C.) of the treatment liquid 1 as measured with a pH meter (WM-50EG, trade name, manufactured by DKK-TOA Corp.) was 1.0.

Malonic acid (an acidic compound, manufactured by Tateyama Kasei Co., Ltd.: 25.0%

Tripropyleneglycol monomethylether (water-soluble organic solvent): 5%

Ion-exchanged water: balance (added so as to attain 100% by mass of total amount)

Preparation of Treatment Liquid 2

The following materials were mixed to prepare a treatment liquid 2. The pH (25° C.) of the treatment liquid 2 as measured with a pH meter (WM-50EG, trade name, manufactured by DKK-TOA Corp.) was 4.0.

Polyethylene imine (cationic polymer, manufactured by Nippon Shokubai Co., Ltd.): 13%

Ion-exchanged water: balance (added so as to attain 100% by mass of total amount)

Preparation of Treatment Liquid 3

The following materials were mixed to prepare a treatment liquid 3. The pH (25° C.) of the treatment liquid 3 as measured with a pH meter (WM-50EG, trade name, manufactured by DKK-TOA Corp.) was 4.0.

Magnesium nitrate: 15%

Diethyleneglycol monomethylether (manufactured by Wako Pure Chemical Industries, Ltd.): 4%

Surfactant A (10%, structure: $C_7H_{15}$—CH=CH—$C_7H_{14}$—C(=O)—N(CH$_3$)—CH$_2$CH$_2$—SO$_3$Na): 1%

Ion-exchanged water: balance (added so as to attain 100% by mass of total amount)

The inks and the treatment liquids prepared in the above processes were used in combinations shown in Table 3, and the anti-blocking property and the accuracy of droplet deposition were evaluated by the following evaluation methods. The results are shown in Table 3.

Anti-Blocking Property

The anti-blocking property was evaluated by using a sample obtained by the image forming process described in the following section "Inkjet Recording".

Inkjet Recording

An image was formed on a recording medium (coated paper, "OK TOP COAT PLUS", trade name, basis weight: 104.7 g/m$^2$), and the resulting image was evaluated. All of the recording media used herein was "OK TOP COAT PLUS."

A line image and a solid image were formed by a single-pass recording system with an ink set including the combination of the inks and the treatment liquid as shown in Table 3.

An inkjet recording apparatus having a structure shown in FIG. 1 including, in a direction (indicated by an arrow) of transporting a recording medium, a treatment liquid application unit 12 equipped with a treatment liquid ejection head 12S that ejects a treatment liquid, a treatment liquid drying zone 13 at which the treatment liquid is dried, an ink ejection unit 14 that ejects inks, an ink drying zone 15 at which the inks are dried, and a UV irradiation unit 16 equipped with a UV irradiation lamp 16S capable of irradiating UV light (UV), was prepared.

The treatment liquid drying zone 13 includes, although not shown in FIG. 1, an air blower that applies a dry air to the recording side of the recording medium, and an infrared heater on the non-recording side of the recording medium. At the treatment liquid drying zone 13, the temperature and the air volume are controlled such that at least 70% by mass of water in the treatment liquid is evaporated (dried) within 900 msec after the application of the treatment liquid is started at the treatment liquid application unit. The ink ejection unit 14 includes, in a direction of transporting (indicated by an arrow), a black ink ejection head 30K, a cyan ink ejection head 30C, a magenta ink ejection head 30M, and a yellow ink ejection head 30Y were disposed in this order. Each of the heads is a full-line head having a width of 1200 dpi/20 inch, and the ink of each color was ejected therefrom in a main scanning direction by a single-pass method.

The treatment liquid and the inks were charged in the tanks (not shown in FIG. 1) connected with the treatment liquid ejection heads and the ink ejection heads of the inkjet apparatus shown in FIG. 1, and a solid image and a line image of 1200 dpi were recorded on the recording medium.

The line image was obtained by recording a 1 dot-width line, a 2 dot-width line, and a 4 dot-width line, at 1200 dpi in a main scanning direction by a single-pass method, and a solid image was formed by ejecting the ink on the entire surface of a sample prepared by cutting a recording medium into an A5 size. The recording conditions were as follows.

(1) Treatment Liquid Application Step

The treatment liquid was ejected onto the recording medium from the treatment liquid application head 12S by a single-pass method. The application amount of the treatment liquid was 1.4 g/m$^2$.

(2) Treatment Step

The treatment liquid was dried in the treatment liquid drying zone 13. The treatment liquid drying zone was positioned such that the recording medium passed therethrough within 900 msec after the ejection of the treatment liquid to the recording medium was started. The recording medium on which the treatment liquid had been ejected was subjected to a drying treatment and a permeation treatment under the following conditions.

Wind velocity: 10 m/s

Temperature: the recording medium was heated with a contact-type plate heater from a side of the recording medium opposite to the recorded side such that the temperature of the recorded side of the recording medium was 60° C.

(3) Ink Application Step

Subsequently, an image was recorded on the recording medium by ejecting the black ink, the cyan ink, the magenta ink and the yellow ink from the ink ejection heads by a single-pass method. A line image and a solid mage were formed by ejecting the ink compositions under the following conditions onto a surface of the recording medium onto which the treatment liquid had been ejected.

Heads: piezoelectric full-line heads with a width of 1,200 dpi/20 inch, four heads were used to eject inks of four colors.

Amount of droplet to be ejected: 2.0 pL

Drive frequency: 30 kHz (4) Ink Drying Step

In the ink drying zone 15, the recording medium on which the ink composition had been applied was dried under the following conditions.

Drying method: air blow drying

Wind velocity: 15 m/s

Temperature: the recording medium was heated with a contact-type plate heater from a side of the recording medium opposite to the recorded side such that the temperature of the recorded side of the recording medium was 60° C.

(5) UV Light Exposure Step

After the drying, the image was exposed to UV light with a meal halide lamp (maximum irradiation wavelength: 365 nm, manufactured by EYE GRAPHICS Co., Ltd.) to cure. The integrated irradiation amount of the UV light was adjusted to be 3 J/cm$^2$.

(6) Fixing Step

Then, the recording medium was subjected to a heat-fixing treatment under the following conditions by passing the recording medium through a pair of rollers.

Silicon rubber rollers (hardness: 50°, nip width: 5 mm)

Temperature of rollers: 70° C.

Pressure: 0.2 MPa

Immediately after the solid image (2-cm square) was printed on the A5-size recording medium by the above inkjet recording process, a non-printed recording medium (same as the recording medium used for the printing, hereinafter referred to as an unused sample) was placed on the solid image and a weight of 350 kg was placed thereon, and this was allowed to stand for 24 hours under the ambient conditions of 60° C. and 30% RH. The degree of ink transferred to a blank portion of the unused sample was inspected by visual observation, and evaluated in accordance with the following evaluation criteria.

Evaluation Criteria

A: ink transfer was not observed at all

B: ink transfer was almost indistinctive

C: ink transfer was observed to some extent, but was acceptable on the practical basis D: ink transfer was significant, and was not acceptable on the practical basis Accuracy of Droplet Deposition A printed sample was prepared in a substantially similar manner to the above, except that the piezoelectric full-line head used in the aforementioned section "Anti-blocking property" was changed to a printer head (GELJET GX5000, trade name, manufactured by Ricoh Co., Ltd.), and ninety-six lines having a length of 10 cm were printed at 75×1200 dpi (nozzle arrayed direction×transporting direction). The droplet amount of the ink was 3.5 pL. The ejection frequency was 24 kHz.

The distances between the adjacent lines of the ninety-six lines were measured at a position 5 cm away from the position at which the ejection was started, with a dot analyzer (DA-6000, trade name, manufactured by Oji Scientific Instruments Co., Ltd). The standard deviation of the distances as measured was calculated so as to evaluate the accuracy of droplet deposition, in accordance with the following evaluation criteria.

Evaluation Criteria
A: from 3 μm to less than 4 μm
B: from 4 μm to less than 5 μm
C: Equal to or more than 5 μm.
Grade C is a non-acceptable level on the practical basis.
The obtained results are shown in Table 3.

2. The ink composition according to claim 1, wherein the wetting agent comprises at least:
   a sugar not having an unsaturated bond in a side chain; or
   a compound represented by any one of following Formulae (I) to (III):

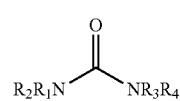

Formula (I)

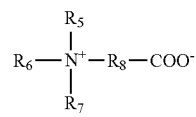

Formula (II)

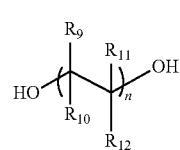

Formula (III)

TABLE 3

|  | Ink | Polymerizable compound | Solid wetting agent | State under normal condition | B/A ratio | Treatment liquid No. | Accuracy of droplet deposition | Anti-blocking property |
|---|---|---|---|---|---|---|---|---|
| Example 1 | 1 | 1 | Urea | Solid | 15 | 1 | A | A |
| Example 2 | 2 | 1 | Glucose | Solid | 15 | 1 | A | A |
| Example 3 | 3 | 1 | Maltitol | Solid | 15 | 1 | A | A |
| Example 4 | 4 | 1 | Sorbitol | Solid | 15 | 1 | A | A |
| Example 5 | 5 | 1 | Betaine anhydrous | Solid | 15 | 1 | A | A |
| Example 6 | 6 | 1 | 2,2-Dimethyl-1,3-propanediol | Solid | 15 | 1 | A | A |
| Example 7 | 7 | 1 | Trimethylolpropane | Solid | 15 | 1 | A | A |
| Example 8 | 8 | 1 | 1,6-Hexanediol | Solid | 15 | 1 | A | A |
| Example 9 | 9 | 1 | 1,2,6-Hexanetriol | Solid | 15 | 1 | A | A |
| Example 10 | 10 | 1 | N-propyl urea | Solid | 15 | 1 | A | A |
| Example 11 | 11 | 3 | Urea | Solid | 100 | 1 | A | A |
| Example 12 | 12 | 2 | Urea | Solid | 15 | 1 | A | A |
| Example 13 | 13 | 4 | Urea | Solid | 0.5 | 1 | A | A |
| Example 14 | 1 | 1 | Urea | Solid | 15 | 2 | A | A |
| Example 15 | 1 | 1 | Urea | Solid | 15 | 3 | A | A |
| Comparative Example 1 | 14 | NK ESTER A-400 | Sugar (II) | Liquid | 15 | 1 | C | B |
| Comparative Example 2 | 15 | 3 | — | — | — | 1 | C | C |
| Comparative Example 3 | 16 | 3 | Glycerin | Liquid | 15 | 1 | B | D |
| Comparative Example 4 | 17 | 3 | Glucose | Solid | 450 | 1 | B | A |

As shown in Table 3, it was confirmed that the inks according to the present invention exhibited an excellent accuracy of droplet deposition and an excellent anti-blocking property.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising a pigment, water, a polymerizable compound having an acrylamide structure, a polymerization initiator and a wetting agent that is in the form of a solid at a temperature of 25° C. and an atmospheric pressure of 1 bar,
   the wetting agent being included in the ink composition in an amount of from 0.01% by mass to 400% by mass with respect to the polymerizable compound having an acrylamide structure.

wherein, in Formula (I) to (III), $R_1$ to $R_7$ each independently represents a hydrogen atom, a saturated or unsaturated hydrocarbon group having 10 or less carbon atoms, a heterocyclic group or an aromatic group; $R_8$ represents a divalent saturated hydrocarbon group having 1 to 3 carbon atoms; $R_9$ to $R_{12}$ each independently represents a hydrogen atom, a saturated or unsaturated hydrocarbon group having 5 or less carbon atoms or a hydroxyl group; n represents an integer of 1 to 30, and when n is 2 or greater, two or more of $R_9$ to $R_{12}$ may be the same or different from each other.

3. The ink composition according to claim 2, wherein the wetting agent is a compound represented by Formula (I).

4. The ink composition according to claim 3, wherein the wetting agent is urea.

5. The ink composition according to claim 1, wherein the proportion of the wetting agent with respect to the polymerizable compound having an acrylamide structure is from 0.1% by mass to 200% by mass.

6. An ink set comprising the ink composition according to claim 1 and a treatment liquid that aggregates the ink composition.

7. The ink set according to claim 6, wherein the treatment liquid comprises at least one of an acidic compound, a polyvalent metal salt or a cationic polymer.

8. An image forming process comprising:
applying a treatment liquid, which aggregates an ink composition, onto a recording medium; and
applying the ink composition by inkjetting onto the recording medium to form an image,
the ink composition comprising a pigment, water, a polymerizable compound having an acrylamide structure, a polymerization initiator and a wetting agent that is in the form of a solid at a temperature of 25° C. and an atmospheric pressure of 1 bar,
the wetting agent being included in the ink composition at a proportion of from 0.01% by mass to 400% by mass with respect to the polymerizable compound having an acrylamide structure.

9. The image forming process according to claim 8, wherein the recording medium is coated paper.

10. The image forming process according to claim 8, wherein the treatment liquid is applied onto the recording medium before the ink composition is applied onto the recording medium.

11. The image forming process according to claim 8, wherein the wetting agent comprises at least:
a sugar not having an unsaturated bond in a side chain; or
a compound represented by any one of following Formulae (I) to (III):

Formula (I)

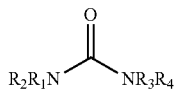

Formula (II)

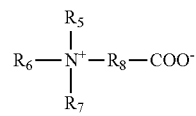

Formula (III)

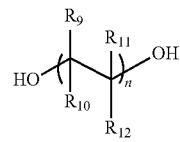

wherein, in Formula (I) to (III), $R_1$ to $R_7$ each independently represent a hydrogen atom, a saturated or unsaturated hydrocarbon group having 10 or less carbon atoms, a heterocyclic group or an aromatic group; $R_8$ represents a divalent saturated hydrocarbon group having 1 to 3 carbon atoms; $R_9$ to $R_{12}$ each independently represents a hydrogen atom, a saturated or unsaturated hydrocarbon group having 5 or less carbon atoms or a hydroxyl group; n represents an integer of 1 to 30, and when n is 2 or greater, two or more of $R_9$ to $R_{12}$ may be the same or different from each other.

12. The image forming process according to claim 11, wherein the wetting agent is a compound represented by Formula (I).

13. The image forming process according to claim 12, wherein the wetting agent is urea.

14. The image forming process according to claim 8, wherein the proportion of the wetting agent with respect to the polymerizable compound having an acrylamide structure is from 0.1% by mass to 200% by mass.

* * * * *